US012557940B2

(12) United States Patent
Senthilnathan et al.

(10) Patent No.: US 12,557,940 B2
(45) Date of Patent: Feb. 24, 2026

(54) AUTOMATIC DISPENSING, COOKING AND SERVING APPARATUS AND METHOD

(71) Applicant: EVOCHEF LLP, Tamil Nadu (IN)

(72) Inventors: Madhura Priya Senthilnathan, Tamil Nadu (IN); L. Senthilnathan, Tamil Nadu (IN)

(*) Notice: Subject to any disclaimer, the term of this patent is extended or adjusted under 35 U.S.C. 154(b) by 636 days.

(21) Appl. No.: 17/753,582

(22) PCT Filed: Sep. 9, 2020

(86) PCT No.: PCT/IN2020/050779
§ 371 (c)(1),
(2) Date: Mar. 8, 2022

(87) PCT Pub. No.: WO2021/048870
PCT Pub. Date: Mar. 18, 2021

(65) Prior Publication Data
US 2024/0041238 A1      Feb. 8, 2024

(30) Foreign Application Priority Data

Sep. 9, 2019      (IN) .............................. 201941036170

(51) Int. Cl.
 *A47J 37/04*      (2006.01)
 *A21B 5/03*      (2006.01)
 *A47J 37/06*      (2006.01)
(52) U.S. Cl.
 CPC .............. *A47J 37/047* (2013.01); *A21B 5/03* (2013.01); *A47J 37/067* (2013.01)
(58) Field of Classification Search
 CPC ...... A47J 27/004; A47J 37/047; A47J 37/067; A47J 37/10; A21B 5/03

(Continued)

(56) References Cited

U.S. PATENT DOCUMENTS 4,733,608 A * 3/1988 Merdy ..................... A21B 5/03
                                                    99/353
9,693,654 B2 * 7/2017 Smith ..................... A47J 36/34
            (Continued)

FOREIGN PATENT DOCUMENTS

CN          201019585          2/2008
CN          106108613 B        5/2018
EP           0214188 B1        5/1991

OTHER PUBLICATIONS

International Search Report, PCT/IN2020/050779, mailed Mar. 12, 2020, 3 pgs.

(Continued)

*Primary Examiner* — Reginald Alexander
(74) *Attorney, Agent, or Firm* — Carlson, Caspers, Vandenburgh & Lindquist, P.A.

(57) ABSTRACT

Described herein is an automatic cooking apparatus 100 and method. The apparatus includes at least one curved heating member 106 configured to move in an arcuate path, and at least one dispensing mechanism for dispensing at least one semi-solid liquid substance on the at least one heating surface 106a, 106b. The curved heating member 106 has at least one heating surface 106a, 106b, which, in the course of dispensing of the semi-solid liquid substance on the heating surface 106a, 106b, moves in the arcuate path to spread the semi-solid liquid substance on the heating surface 106a, 106b. The heating surface 106a, 106b is also configured to attain one or more cooking positions in the arcuate path after the semi-solid liquid substance is suitably spread on it for cooking the at least one semi-solid liquid substance.

9 Claims, 14 Drawing Sheets

(58) Field of Classification Search
   USPC .......................................... 99/422, 423, 424
   See application file for complete search history.

(56)                    References Cited

U.S. PATENT DOCUMENTS

| | | | |
|---|---|---|---|
| 11,737,602 B2* | 8/2023 | Pan | A47J 37/108 |
| | | | 99/329 P |
| 2009/0208621 A1* | 8/2009 | Dotan | A23L 5/11 |
| | | | 99/348 |

OTHER PUBLICATIONS

Written Opinion of the International Searching Authority, PCT/IN2020/050779, mailed Mar. 12, 2020, 6 pgs.

* cited by examiner

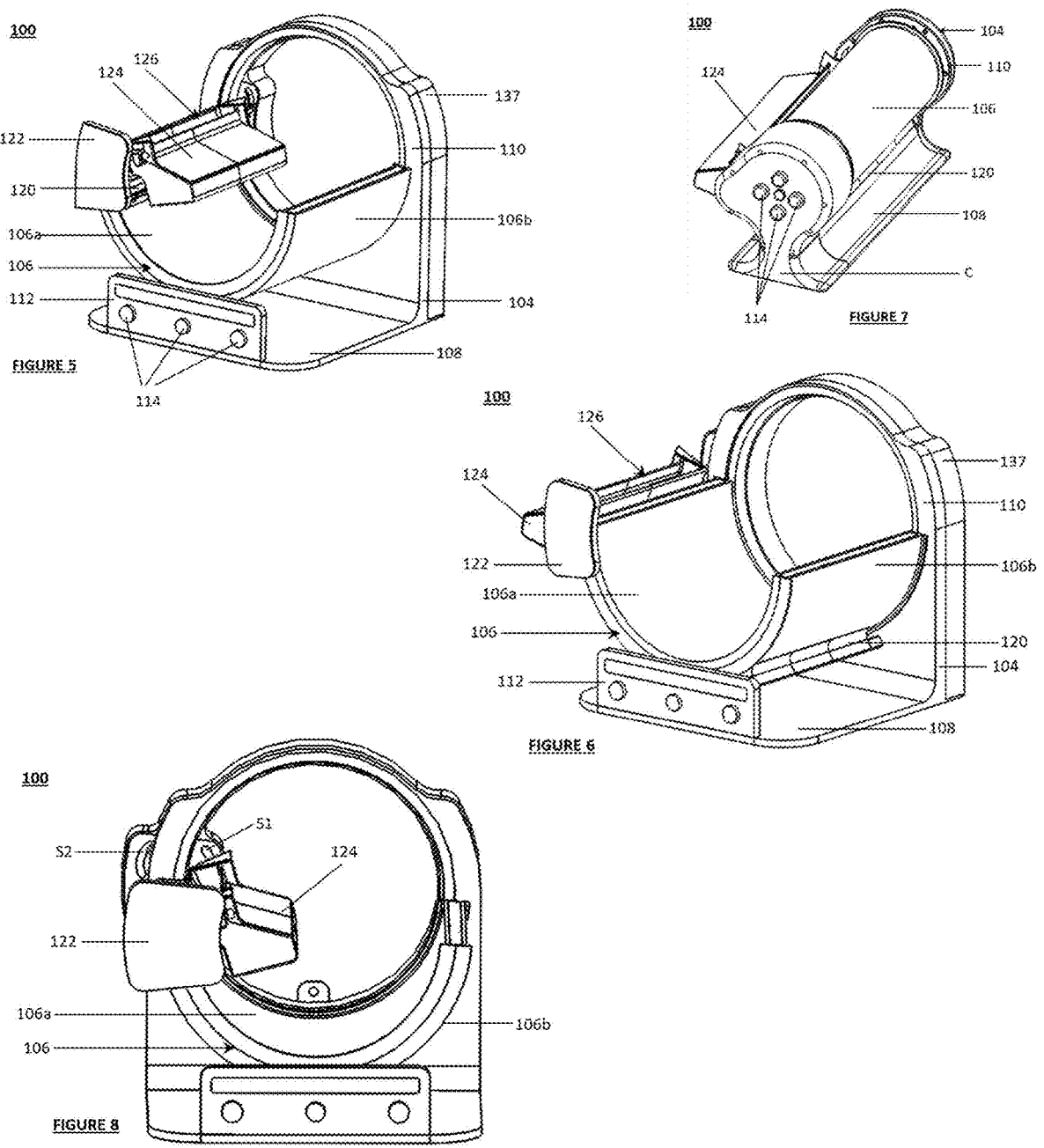

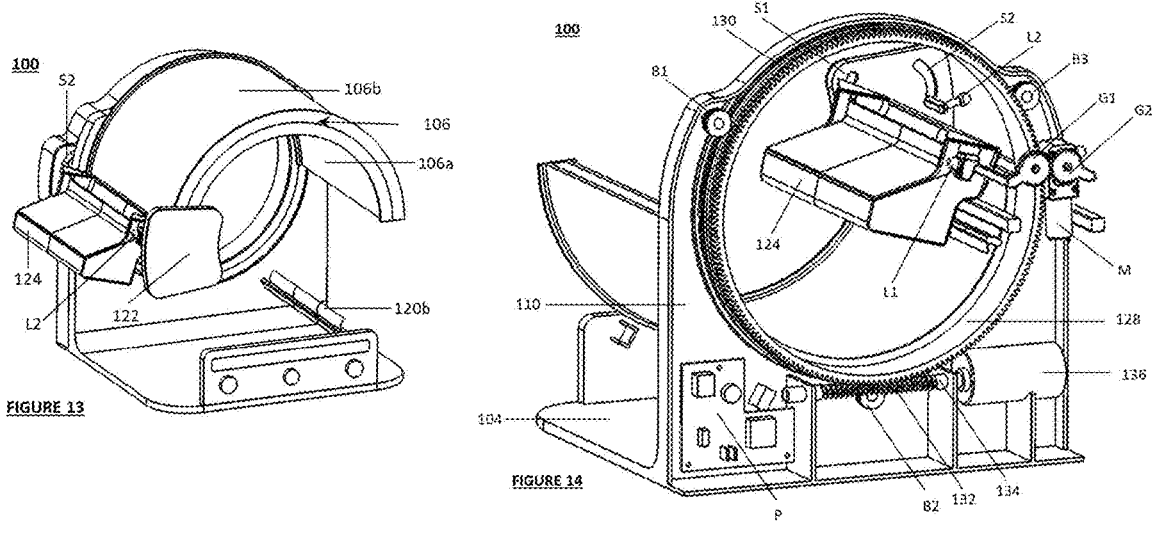
FIGURE 13
FIGURE 14
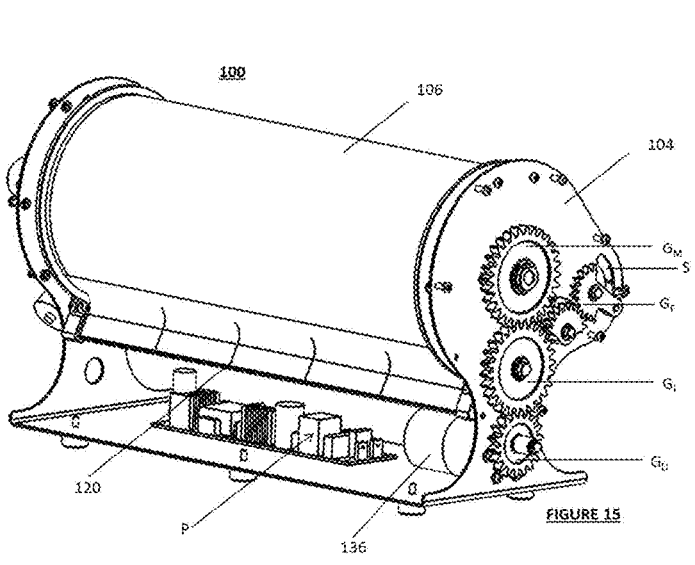
FIGURE 15
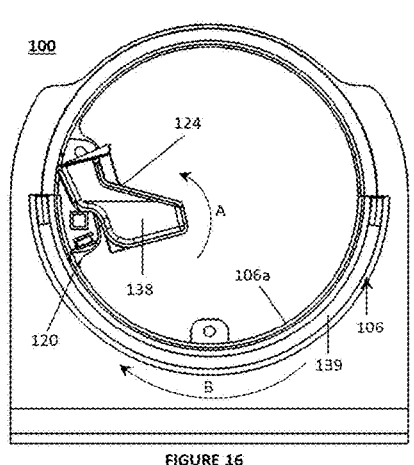
FIGURE 16

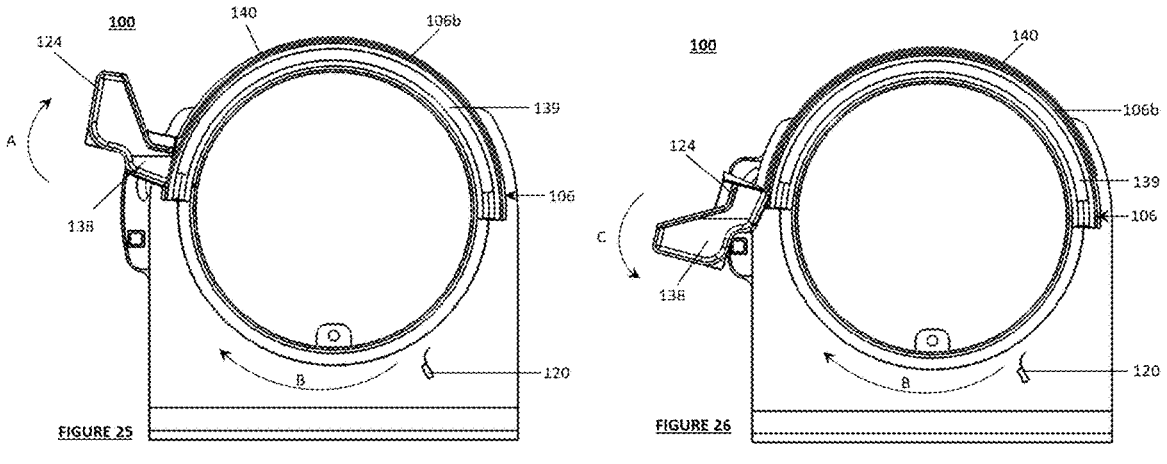
FIGURE 25
FIGURE 26
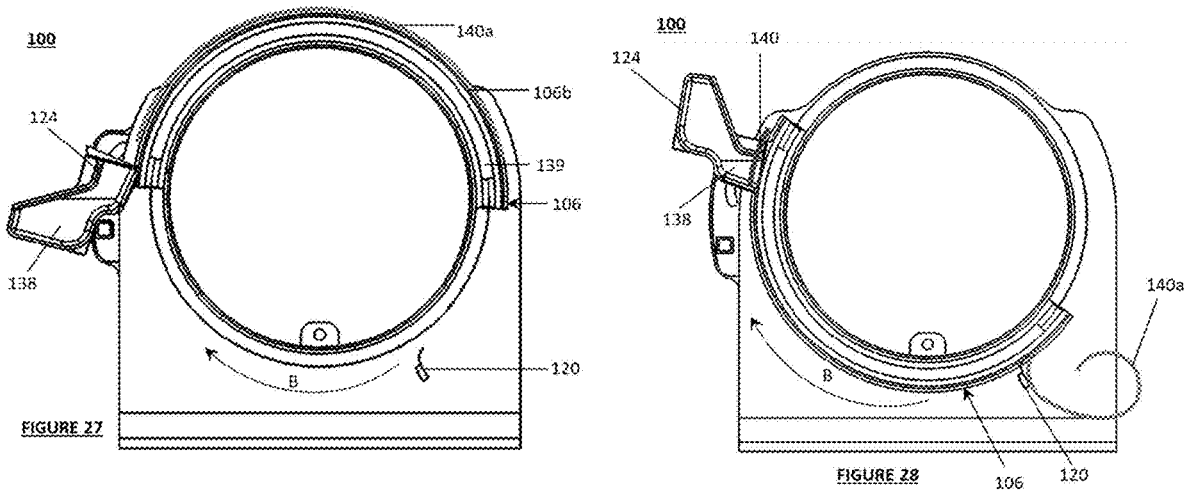
FIGURE 27
FIGURE 28

166

124

L

168

174

166

124

L

168

174

166

L

168

124

174

106

106

B1,
B2,
B3

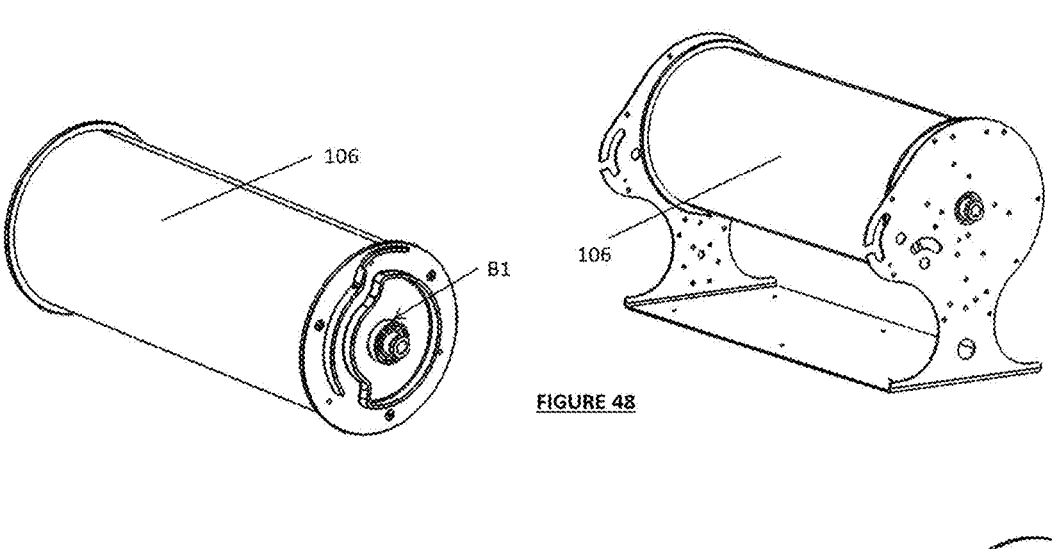
FIGURE 48
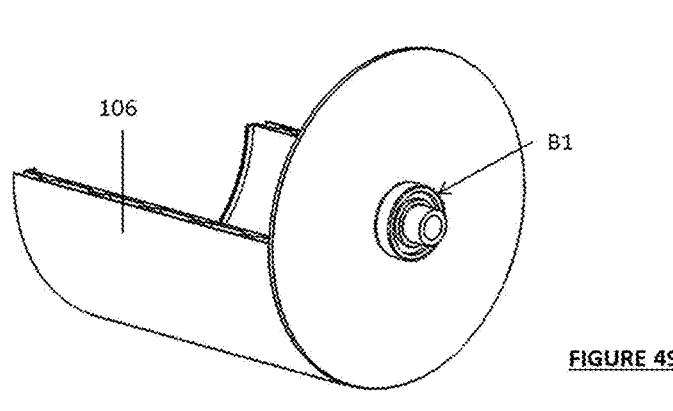
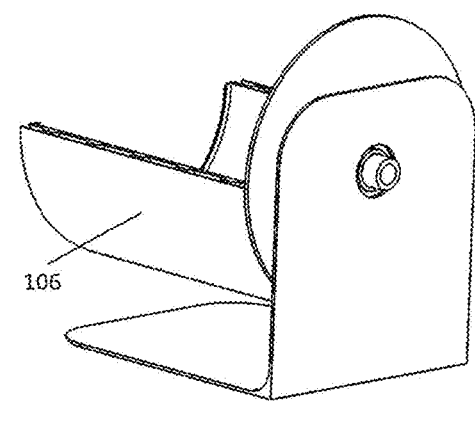
FIGURE 49
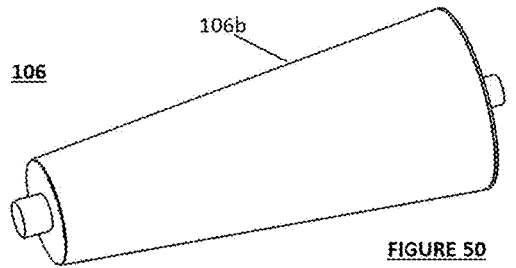
FIGURE 50

AUTOMATIC DISPENSING, COOKING AND SERVING APPARATUS AND METHOD

TECHNICAL FIELD

The present subject matter, in general, relates to an automatically operated cooking apparatus and in particular, relates to an apparatus and method for automatic dispensing, spreading and cooking of raw ingredients comprising semi-solid liquid substance, and serving the food item thus prepared.

BACKGROUND

Cooking of food items, especially those prepared from semi-solid liquid raw ingredients, is generally performed manually due to complex steps and requirement of controlled parameters, such as temperature, thickness of food products, ingredient levels, uniform mixing and spreading etc. Conventional cooking apparatuses are customarily available to perform one step of multi-level steps required for food preparation at any given time. Simultaneous performing of several steps of cooking along with controlling of afore-mentioned parameters requires an arduous labor and is relatively quiet time consuming. Some conventional apparatuses are required to be manually tilted in varying positions for facilitating collection and spreading of raw material onto the heating surface. Even after all steps of cooking are completed, serving of cooked food item requires precise handling by the user. Therefore, a great amount of human intervention is required even for cooking a food item in an automatic cooking apparatus known in the art. Further, uneven application of raw ingredients on a heating surface leads to uneven thickness and roast levels of the final food item, and also to irregular control of degree of heat applied to the food item, thereby affecting the flavor and texture characteristics of the cooked food item. Moreover, serving of cooked food in manual cooking process or in conventional cooking apparatus requires expertise in order to maintain texture of the food item.

Fully automatic cooking apparatuses which perform more than one step of cooking food items are also known. However, such cooking apparatuses are restricted to cooking only one type food item or different food items of same category. Even for a single type of food item preparation, separate components/sub-assemblies are employed by such fully automatic apparatuses for performing different cooking steps. Having large number of components/sub-assemblies for separate cooking steps puts a question mark on the reliability of such apparatuses. Further, large number of drives and moving parts add to the challenges of reduced working life cycle and efficiency of such fully automatic cooking apparatuses. Large number of parts and subassemblies of the apparatus occupies large space. Moreover, sound and vibrations due to multiple drives and moving parts play quiet a decisive role in selection of a cooking apparatus by customers.

Therefore, there is a well felt need for a fully automatic cooking apparatus that is simple and economical and at the same time is able to automatically perform complex cooking techniques of different type of food items as well as food items of different categories in an efficient and reliable manner without compromising its safety and stability. Further, it is desired to provide an automatic cooking apparatus and method which is capable of achieving uniform dispensing and controlling of cooking substance in an easy and cost-effective manner with minimum moving components. Moreover, it is desired that the cooked food item

SUMMARY

An object of the present subject matter is to provide an automatic dispensing, cooking and serving apparatus that requires no human intervention in performing the cooking operation and has long service life.

Yet another object of the present subject matter is to provide an automatic dispensing, cooking and serving apparatus that is capable of achieving desired flavor and texture characteristics of a food item.

Yet another object of the present subject matter is to provide a reliable and efficient cooking apparatus that is capable of cooking different types food items in the same category as well as different categories.

Yet another object of the present subject matter is to provide an economical and simple cooking apparatus, which is capable of achieving uniform dispensing and controlling of cooking substance in an easy and cost-effective manner with the help of gravitational force.

Yet another object of the present subject matter is to provide an automatic dispensing, cooking and serving apparatus, which deploys a motor to achieve necessitated power to operate, making the overall apparatus cost-effective.

Yet another object of the present subject matter is to provide an automatic cooking apparatus, which ensures continuous monitoring of vital cooking parameters such as thickness of product, roast levels, quantity of raw material to be supplied, measuring of different kinds and variety of ingredients and so on.

Yet another object of the present subject matter is to provide a compact automatic cooking apparatus, which has a curved heating surface for uniform cooking of raw material and precise removal of cooked food item.

Yet another object of the present subject matter is to provide a compact automatic cooking apparatus, which has a curved heating surface to facilitate feeding and collection of cooking substance in an easy and smooth manner.

Yet another object of the present subject matter is to provide an automatic dispensing, cooking and serving apparatus with reduced components/sub-assemblies and moving parts for performing cooking operation and hence, reduced sound and vibrations.

Yet another object of the present subject matter is to provide an automatic cooking apparatus, which is capable of dispensing and uniformly spreading raw ingredients comprising semi-solid liquid substance on a cooking surface without any human intervention for performing the cooking operation and at the same time is capable of efficiently controlling levels of heat to be applied to different kinds of food products.

Yet another object of the present subject matter is to provide an automatic cooking apparatus, which is capable of serving the cooked food item without any human intervention and is safe to operate.

Yet another object of the present subject matter is to provide an automatic cooking apparatus, which is capable of cooking a food item on either or both sides of a heating surface.

An automatic cooking apparatus is provided herein, which comprises at least one curved heating member configured to move in an arcuate path, the at least one curved heating member comprising at least one heating surface; and at least one dispensing mechanism for dispensing at least one semi-solid liquid substance on the at least one heating surface. The at least one curved heating member, in the course of dispensing of the at least one semi-solid liquid substance on the at least one heating surface, moves in the arcuate path to spread the at least one semi-solid liquid substance on the at least one heating surface, and attains one or more cooking positions in the arcuate path after the at least one semi-solid liquid substance is suitably spread on the at least one heating surface for cooking the at least one semi-solid liquid substance.

In an embodiment of the present subject matter, the at least one curved heating member comprises a drum- or semi-drum- or partial-drum-configuration having same or varying diameter across its length and is configured to rotate, in clockwise and/or anticlockwise direction, by about 360 degrees or less than 360 degrees in the arcuate path.

In another embodiment, the at least one heating surface comprises a concave surface of the at least one curved heating member or a convex surface of the at least one curved heating member or both concave and convex surfaces of the at least one curved heating member.

In yet another embodiment, the at least one dispensing mechanism comprises at least one storage tank and/or at least one feeder tank mechanism having at least one rotatable feeder tank for dispensing the at least one semi-solid liquid substance on the at least one heating surface.

In yet another embodiment, the feeder tank mechanism comprises a feeder motor and a gear mechanism or cam mechanism for rotating the feeder tank in a dispensing position and a retracted position.

In yet another embodiment, the feeder tank comprises one or more separators for separating the inner volume of the feeder tank, thereby enabling cooking of different varieties of food items in a single cooking operation.

In yet another embodiment, the at least one dispensing mechanism is mounted on a base structure and/or an elongated structure supported on the base structure to dispense the semi solid liquid substance on the cooking surface of the heating member.

In yet another embodiment, the apparatus comprises a peeling mechanism for removing a cooked food item, prepared by cooking the at least one semi-solid liquid substance on the at least one heating surface, from the at least one heating surface.

In yet another embodiment, the apparatus comprises a driving mechanism comprising a worm wheel drive assembly or spur gear drive assembly for moving the at least one curved heating member in an arcuate path.

A method of cooking a semi-solid liquid substance into a cooked food item is also provided herein. The method comprises the steps of dispensing at least one semi-solid liquid substance on the at least one heating surface of at least one curved heating member; moving, in the course of dispensing of the at least one semi-solid liquid substance on the at least one heating surface, the at least one curved heating member in an arcuate path to spread the at least one semi-solid liquid substance on the at least one heating surface; and attaining one or more cooking position in the arcuate path of the at least one curved heating member after the at least one semi-solid liquid substance is suitably spread on the at least one heating surface for cooking the at least one semi-solid liquid substance.

In yet another embodiment, the step of dispensing of the at least one semi-solid liquid substance on the at least one heating surface is performed by rotation of at least one feeder tank and/or squeezing at least one storage tank and/or by operating a valve opening or by operating a feed pump dispensing of liquid substance can be achieved.

In yet another embodiment, the step of moving the at least one curved heating member in the arcuate path comprises rotating, in clockwise and/or anticlockwise direction, the at least one curved heating member by about 360 degrees or less than 360 degrees in the arcuate path.

In yet another embodiment, the step of attaining one or more cooking position in the arcuate path of the at least one curved heating member the at least one curved heating member in the cooking position comprises attaining a position not limited to one or combination of a topmost position, a bottommost position, a position between topmost position and the bottommost position of the heating member for a pre-determined period to enable cooking of the at least one semi-solid liquid substance on the at least one heating surface.

In yet another embodiment, the method further comprises the step of removing a cooked food item, prepared by cooking the at least one semi-solid liquid substance on the at least one heating surface, from the at least one heating surface.

In yet another embodiment, the method further comprises the step of dispensing the at least one semi-solid liquid substance on the at least one heating surface simultaneously or consecutively to the step of the removing the cooked food item from the at least one heating surface.

In yet another embodiment, the method comprises the step of only removing the cooked food item from the at least one heating surface without simultaneously or consecutively dispensing the at least one semi-solid liquid substance on the at least one heating surface in the cooking operation of last food item.

BRIEF DESCRIPTION OF ACCOMPANYING
DRAWINGS

The present invention, both as to its organization and manner of operation, together with further objects and advantages, may best be understood by reference to the following description, taken in connection with the accompanying drawings. These and other details of the present invention will be described in connection with the accompanying drawings, which are furnished only by way of illustration and not in limitation of the invention, and in which drawings:

FIGS. 5, 6 and 7 illustrate perspective views of an automatic dispensing, cooking and serving apparatus in accordance with second, third and fourth embodiments of the present subject matter respectively.

FIGS. 8, 9 & 10 illustrate a front view, a front perspective view from right side and a front perspective view from left side respectively of an automatic dispensing, cooking and serving apparatus depicting the curved heating member oriented in bottommost position/cooking position for concave surface printing in accordance with fifth embodiment of the present subject matter.

FIGS. 11, 12 & 13 illustrate a front view, a front perspective view from right side and a front perspective view from left side respectively of an automatic dispensing, cooking and serving apparatus depicting the curved heating member oriented in topmost position/cooking position for convex surface in accordance with fifth embodiment of the present subject matter.

FIG. 14 illustrates a rear perspective view of an automatic dispensing, cooking and serving apparatus depicting driving mechanism of the feeder motor M and driving mechanism of the curved hot plate in accordance with fifth embodiment of the present subject matter.

FIG. 15 illustrates a perspective view of the automatic dispensing, cooking and serving apparatus 100 depicting the driving mechanism in accordance with the fourth embodiment explained in FIG. 7 above.

FIGS. 16 to 22 illustrate schematic representations of the automatic dispensing, cooking and serving apparatus depicting working of said apparatus for cooking a food item on the concave surface of the curved heating member from a semi-solid liquid substance in accordance with one embodiment of the present subject matter.

FIGS. 23 to 29 illustrate schematic representations of the automatic dispensing, cooking and serving apparatus depicting working of said apparatus for cooking a food item on the convex surface of the curved heating member in accordance with one embodiment of the present subject matter.

FIGS. 30 to 34 illustrate a schematic representation of an automatic dispensing, cooking and serving apparatus in accordance with sixth embodiment of the present subject matter.

Figures 33, 34, 35, 36:
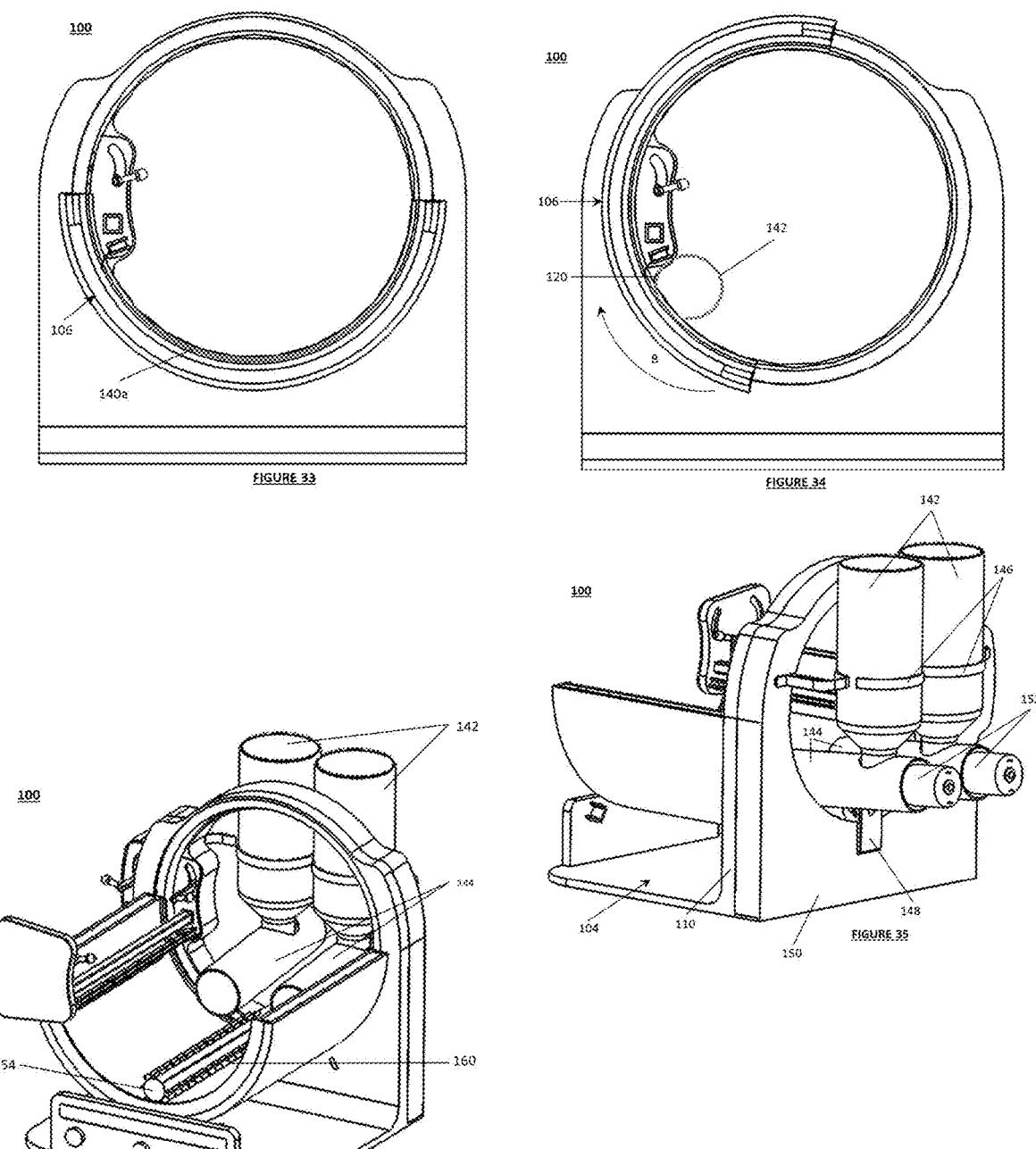

FIG. 35 illustrates a rear perspective view of the automatic dispensing, cooking and serving apparatus in accordance with sixth embodiment of the present subject matter.

FIG. 36 illustrates a front perspective view of the automatic dispensing, cooking and serving apparatus comprising one or more chopping or stirring rollers in accordance with sixth embodiment of the present subject matter.

Figure 37:
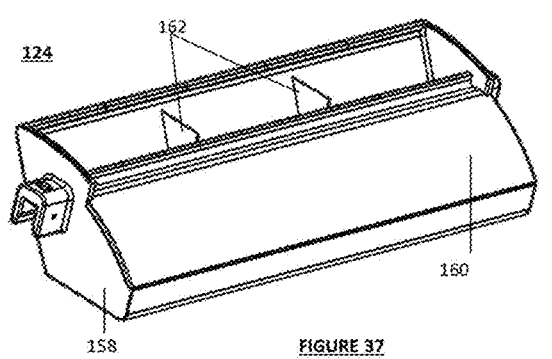
Figure 38:
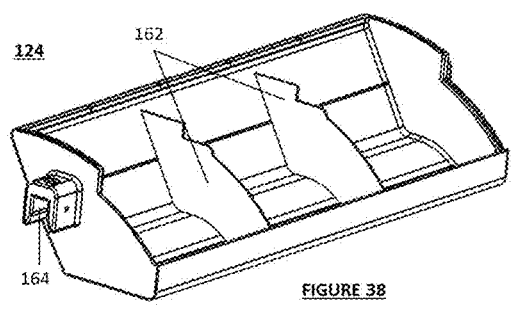

FIGS. 37 and 38 illustrate a perspective view and an opened view of the feeder tank in an embodiment of the present subject matter.

FIGS. 39 to 44 illustrate schematic representations of feeder tank rotation mechanisms in different embodiments of the present subject matter.

FIGS. 45 to 49 depict various mechanisms for supporting the curved heating member according to the present subject matter.

FIGS. 50 to 54 depict various configurations of the curved heating member 106 in different embodiments according to the present subject matter.

DETAILED DESCRIPTION

The following presents a detailed description of various embodiments of the present subject matter with reference to the accompanying drawings.

The embodiments of the present subject matter are described in detail with reference to the accompanying drawings. However, the present subject matter is not limited to these embodiments which are only provided to explain more clearly the present subject matter to a person skilled in the art of the present disclosure. In the accompanying drawings, like reference numerals are used to indicate like components.

The specification may refer to "an", "one", "different" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "attached" or "connected" or "coupled" or "mounted" to another element, it can be directly attached or connected or coupled to the other element or intervening elements may be present. As used herein, the term "and/or" includes any and all combinations and arrangements of one or more of the associated listed items.

The figures depict a simplified structure only showing some elements and functional entities, all being logical units whose implementation may differ from what is shown.

The present subject matter relates to an automatic dispensing, cooking and serving apparatus that is capable of cooking food items such as dosa, crepe, uttapam, pancake, omelette and other similar dishes from at least one semi-solid liquid substance. For the purpose of the present description, at least one semi-solid liquid substance preferably comprises at least one semi-solid liquid food substance that includes but not limited to batter or other semi-solid liquid raw ingredients for dosa, uttapam, crepe and other similar food products. The semi-solid liquid substance may also include but not limited to beaten eggs/egg mixture for cooking omelette, scrambled eggs and other similar food items. The batter and/or egg mixture may comprise plain raw ingredients or may include finely cut fillings like onions, tomato etc.

The present invention employs a drum-shaped or semi-drum-shaped or partial-drum-shaped heating surface, which is also the cooking surface, having same or varying diameter across its length and is configured to rotate, in clockwise and/or anticlockwise direction, by about 360 degrees or less than 360 degrees in the arcuate path. A pre-determined quantity of semi-solid liquid substance is automatically dispensed and allowed to cook on said heating surface. After the cooking operation is complete, the cooked food item is automatically removed from the heating surface and served at a pre-determined location. The location where the cooked food item is served can be within the apparatus or outside the apparatus containing the heating surface without departing from the scope of the present subject matter. The heating surface is configured to rotate about its axis during dispensing of the semi-solid liquid substance on it, and during removal of the cooked food item. The curved heating member stays in cooking position for predetermined time to cook the semisolid liquid substance. In a preferred embodiment, the heating surface is configured to rotate 360 degrees about its axis.

Figures 1, 2, 3, 4:
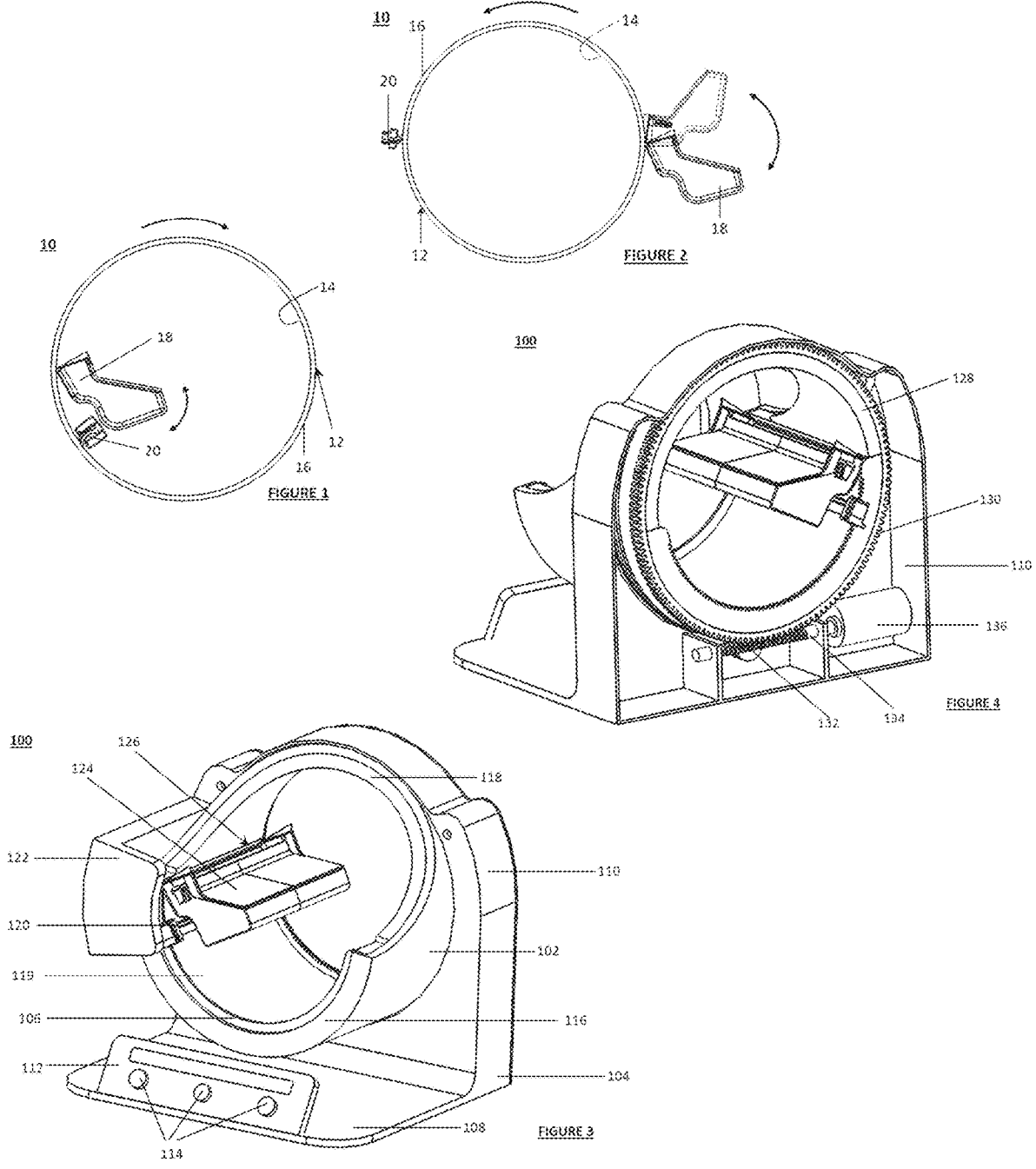
FIGS. 1 and 2 illustrate schematic representations of a cooking mechanism of an automatic dispensing, cooking and serving apparatus in accordance with two different embodiments of the present subject matter.
FIGS. 3 and 4 illustrate a front perspective view and a rear perspective view of an automatic dispensing, cooking and serving apparatus in accordance with a first embodiment of the present subject matter.

FIGS. 1 and 2 illustrate schematic representations of a cooking mechanism 10 of an automatic dispensing, cooking and serving apparatus in accordance with two different embodiments of the present subject matter. The cooking mechanism 10 comprises but not limited to a curved heating member 12, preferably in the form of a drum or a semi-drum configuration. According to the present subject matter, either the inner surface or the outer surface of the heating member 12 forms the heating or cooking surface. In the embodiment depicted in in FIG. 1, the inner surface 14 of the heating member 12 forms the heating or cooking surface whereas the outer surface 16 of the heating member 12 forms the heating or cooking surface in FIG. 2. During operation, the heating member 12 is rotated either in clockwise direction as shown in FIG. 1 or in anticlockwise direction as shown in FIG. 2. A dispensing mechanism comprising at least one feeder tank mechanism with at least one rotatable feeder tank 124 is provided for dispensing the semi-solid liquid substance on the heating surface. In a preferred embodiment, the feeder tank 18 is rotatably disposed in the proximity of the heating or cooking surface to dispense a required quantity of semi-solid liquid substance on said heating or cooking surface during rotation of the heating member 12. The heating or cooking surface may comprise either inner surface 14 of the heating member 12 as shown in the embodiment of FIG. 1 or the outer surface 16 of the heating member 12 as shown in the embodiment of FIG. 2.

The embodiment described in FIG. 1 with the heating member 12 having inner surface as heating surface is shown as being rotatable in clockwise direction and the embodiment described in FIG. 2 with the heating member 12 having outer surface as heating surface is shown as being rotatable in anticlockwise direction. However, direction of rotation of the heating member 12 is not restricted to the heating surface and may be varied. Further, in another embodiment, the direction of rotation of the heating member 12 may be partially clockwise and partially anticlockwise in a single operation of the apparatus.

Once the desired amount of semi-solid liquid substance is dispensed on the heating surface, the feeder tank 18 is rotated back to its original position and while retracting back, the feeder tank 18 recollects the excess semi-solid liquid substance. Thereafter, heating member 12 attains one or more cooking positions in the arcuate path wherein the semi-solid liquid substance is allowed to cook on the heating surface for a pre-determined period. After the food item from the semi-solid liquid substance is cooked, the heating member 12 is further rotated to allow a peeling mechanism comprising a blade 20 mounted either on the inner surface 14 as shown in FIG. 1 or the outer surface 16 as shown in FIG. 2 to peel the cooked food item therefrom. FIG. 3 illustrates a front perspective view of an automatic dispensing, cooking and serving apparatus 100 in accordance with a first embodiment of the present subject matter. In a preferred embodiment, the apparatus 100 is configured to cook food items including but not limited to dosa, crepe, uttapam, pancake, omelette and other similar dishes. The apparatus 100 according to the present subject matter includes a curved heating member casing 102 that is rotatably mounted on a base structure 104. The curved heating member casing 102 is a cylindrical member having a horizontal central axis (not shown). In the present embodiment, the width of approximately half of the circumference of the hot plate casing 102 is such that it accommodates the width of a at least one curved heating member 106. The remaining circumference of the hot plate casing 102 has a reduced width, which is sufficient to be held or supported by the base structure 104. In the present embodiment, width of the cylindrical hot plate casing 102 is maximum across half of its circumference and minimum across remaining half of its circumference. However, as would be clear to a person skilled in the art, the width of the cylindrical hot plate casing 102 can be varied differently at different locations of its circumference.

The hot plate casing 102 is securely held or gripped by the base structure 104 in its horizontal position. The base structure 104 is the stationary component, which supports all components and sub-assemblies of the apparatus 100. The base structure 104 has L-shaped cross-section with a horizontal base 108 and a vertical member 110 in the present embodiment. In a preferred embodiment, the apparatus 100 is mounted on a horizontal surface, such as a slab, table etc., with the help of the horizontal base 108 for performing the cooking operation. Alternately, in another embodiment, provisions may be provided at the vertical member 110 for mounting the apparatus 100 on a wall. The horizontal base 108 is provided with a control panel 112 that includes a plurality of knobs 114 for operating the apparatus 100 in an embodiment. In another embodiment, the control panel 112 may comprise an electronic control board with digital interface unit and/or by remote control depending on the version.

The curved heating member 106 is mounted on the curved heating member casing 102 such that the curved heating member 106 is secured to the wider portion 116 of the hot plate casing 102 as shown in FIG. 3. In an embodiment of the present subject matter, the width of the curved heating member 106 is slightly less than the width of the wider portion 116 of the hot plate casing 102. In other embodiments, the width of the curved heating member 106 is same or more than the width of the wider portion 116 of the hot plate casing 102. Moreover, the curvature of the curved heating member 106 matches with the curvature of the wider portion 116 of the hot plate casing 102. In a preferred embodiment, the curved heating member 106 does not extend to the narrow portion 118 of the hot plate casing 102 as shown in FIG. 3. However, the curved heating member 106 may extend to the narrow portion 118 of the hot plate casing 102 as per requirement in another embodiment. As can be seen from FIG. 3, the convex portion of the curved heating member 106 faces the concave portion of the wider portion 116 and the concave portion 119 of the curved heating member 106 forms the cooking surface. In an embodiment, the curved heating member 106 is integrated with the wider portion 116 whereas in other embodiments, the curved heating member 106 is attached to the wider portion 116 by removable attachment means including but not limited to clamps, brackets etc.

A peeling mechanism, comprising but not limited to an elongated blade 120 is mounted across the width of the curved heating member 106 such that the edge of the blade 120 is in close proximity to the concave surface 119 of the curved heating member 106 in a preferred embodiment. In another embodiment, the edge of the blade 120 touches the concave surface of the curved heating member 106. The elongated blade 120 is a stationary component, both ends of which are secured to the stationary base structure 104. In an embodiment, the base structure 104 comprises an elongated structure 122 that supports one end of the elongated blade 120 while the other end of the elongated blade 120 is attached to a rear wall (not shown) of the base structure 104.

The apparatus also includes a dispensing mechanism comprising at least one feeder tank mechanism. The feeder tank mechanism comprises at least one rotatable feeder tank 124 for dispensing the semi-solid liquid substance on the heating surface. The feeder tank 124, also referred to as a cartridge, is hingedly mounted on the base structure 104 such that the feeder tank extends across the width of the curved heating member 106. One end of the feeder tank 124 is secured to the elongated structure 122 whereas the other end is attached to the rear wall (not shown) of the base structure 104. The feeder tank 124 has an open end 126 for filling and dispensing raw ingredient, such as semi-solid liquid substance like dosa batter, egg batter or crepe batter, and other similar dishes. The open end 126 of the feeder tank 124 is placed in close proximity to the concave surface of the curved heating member 106 such that during dispensing stroke, semi-solid liquid substance of required thickness is dispensed onto the curved heating member 106.

FIG. 4 illustrates a rear perspective view of the automatic cooking apparatus 100 in accordance with the first embodiment of the present subject matter. This figure depicts components and sub-assemblies supported by and located in the vertical member 110 of the base structure 104. For the purpose of illustration of components and sub-assemblies supported by and located in the vertical member 110, the rear wall of the vertical member 110 is not shown in FIG. 4.

As can be seen in FIG. 4, a wheel 128 is fixed to the rear side of the hot plate casing 102. In an embodiment, the wheel 128 forms an integral part of the hot plate casing 102 whereas in other embodiments, the wheel 128 may be detachably attached to the hot plate casing 102. The wheel 128 forms the drive member of the hot plate casing 102 such that rotation of the wheel 128 causes rotation of the hot plate casing 102, and hence the curved heating member 106. In a preferred embodiment, the wheel 128 comprises a plurality of circumferential teeth 130, which engage with thread 132 on a main drive shaft 134. The main drive shaft 134 is actuated by a main drive motor 136 as shown in FIG. 4. In the embodiment depicted in FIG. 4, the sub-assembly comprising the wheel 128 and the main drive shaft 134 operates as a worm wheel drive assembly. In other words, the main drive shaft 134 once actuated by the main drive motor 136 rotates about its axis. The rotation of the main drive shaft 134 causes rotation of the wheel 128 about its axis, which is perpendicular to the axis of the main drive shaft 134, due to engagement of the thread 132 on the main drive shaft 134 and the teeth 130 on the wheel 128. This causes rotation of the curved heating member casing 102 that is fixed to the wheel 128. The degree of rotation or oscillation of the wheel 128 is regulated by regulating the main drive motor 136. In another embodiment, the sub-assembly comprising the wheel 128 and the main drive shaft 134 operates as a spur gear drive assembly or any similar assembly.

FIG. 5 illustrates a front perspective view of an automatic cooking apparatus 100 in accordance with second embodiment of the present subject matter. As shown in FIG. 5, a rear wall 137 is provided at the rear side of the vertical member 110 of the base structure 104 and along with the vertical member 110 encompasses various components and sub-assemblies of the apparatus 100. In the present embodiment, the at least one curved heating member 106 is not supported on a hot plate casing but is directly mounted on the vertical member 110 of the base structure 104. Further, the wheel 128 having a plurality of circumferential teeth 130 is directly fixed to the rear side of the curved heating member 106. The curved heating member 106 according to the embodiment depicted in FIG. 5 has a partial drum configuration. In particular, the curved heating member 106 of the present embodiment is configured as a half drum. However, as would be clear to a person skilled in the art, the configuration of the curved heating member 106 may comprise more than or less than half drum. Similarly, configuration of the curved heating member 106 is not limited to a drum or a partial drum or a half drum having equal diameter throughout its length. The diameter of the curved heating member 106 may vary along its length as is explained later in the description. The curved heating member 106 comprises a concave surface 106*a* and a convex surface 106*b* with a heating element placed between said concave surface 106*a* and said convex surface 106*b* in a preferred embodiment. However, in another embodiment, the heating element may be located on the concave surface 106*a* and/or the convex surface 106*b*. In the present embodiment, the concave surface 106*a* of the curved heating member 106 forms the heating surface or cooking surface of the apparatus 100. The at least one curved heating member 106 is configured to move in an arcuate path. In the ready position, the curved heating member 106 is located at the bottommost position/cooking position in a preferred embodiment as depicted in FIG. 5. The curved heating member 106 is rotated up to its dispensing position. Then the semi-solid liquid substance from the feeder tank 124 is dispensed through its open end 126 on the concave surface 106*a*, which is also the heating surface or the cooking surface, of the curved heating member 106 by tilting the feeder tank 124 in the similar manner as in the first embodiment depicted in FIG. 4. Simultaneously, the curved heating member 106 is rotated in the clockwise direction, thereby allowing uniform printing of the semi-solid liquid substance on the concave surface 106*a*. When a required semi-solid liquid substance is dispensed on the concave surface 106*a*, the feeder tank 124 rotates back to its normal position as depicted in FIG. 5. The feeder tank 124 only dispenses the required semi-solid liquid substance on the heating surface and the excess semi-solid liquid substance is recollected in the feeder tank during retraction stroke of feeder tank 124. The semi-solid liquid substance is then allowed to cook on the concave surface 106*a* after the heating member 106 attains one or more cooking positions in the arcuate path. The cooking positions of the heating member 106 comprises but not limited to one or combination of a topmost position, a bottommost position, a position between topmost position and the bottommost position of the heating member 106. Once the cooking is complete, the curved heating member 106 is again rotated form the position depicted in FIG. 5 in clockwise direction. During rotation, the elongated blade 120 of the peeling mechanism is mounted below the feeder tank 124 starts peeling the cooked food item and at the same the feeder tank 124 starts printing the semi-solid liquid substance on the concave surface 106*a* for the next food item in a similar manner as depicted above. Once the last food item is cooked, it is only removed or peeled by the elongated blade 120 and in this cooking operation of last food item, the feeder tank 124 does not print semi-solid liquid substance on the concave surface 106*a*. In different embodiments, the at least one semi-solid liquid substance is dispensed simultaneously or consecutively to removing the cooked food item from the at least one heating surface 106*a*, 106*b*. As shown in FIG. 5, the control panel 112, the base structure 104 and the feeder tank 124 having configuration and working similar to those depicted in the embodiment of FIG. 3. However, the configuration of the elongated structure 122 in the present embodiment is different.

FIG. 6 illustrates a front perspective view of an automatic cooking apparatus 100 in accordance with third embodiment of the present subject matter. The configuration of the apparatus 100 of FIG. 6 is similar to the one depicted in FIG. 5. The primary difference being that in the embodiment of FIG. 6, the convex surface 106*b* of the curved heating member 106 forms the heating surface or cooking surface. In the present embodiment, the feeder tank 124 is mounted towards the convex surface 106*b* of the curved heating member 106 such that the open end 126 of the feeder tank 124 is placed in close proximity to the convex surface 106*b* of the curved hot plate 106. During the dispensing stroke, a required quantity of semi-solid liquid substance is dispensed onto the convex surface 106*b* of the curved hot plate 106 by tilting the feeder tank 124 as described above. Simultaneously, the curved heating member 106 is rotated in the clockwise direction, thereby allowing uniform printing of the semi-solid liquid substance on the convex surface 106*b*. After a required semi-solid liquid substance is dispensed on the convex surface 106*b*, the feeder tank 124 retracts back to its original position and while the feeder tank 124 retracts, excess semi-solid liquid substance is recollected in the feeder tank. Simultaneously, the curved heating member 106 attains a topmost position and at this point in time, the semi-solid liquid substance is allowed to cook. In the present embodiment, the elongated blade 120 is mounted on the base structure 104 away from the feeder tank 124, as shown in FIG. 6. In the present embodiment, the topmost position of the heating member 106 comprises the cooking position. However, as would be clear to a person skilled in the art, the cooking position of the heating member 106 may comprises but not limited to one or combination of a topmost position, a bottommost position, a position between topmost position and the bottommost position of the heating member 106. In another embodiment, the cooking position may include a state in which the heating member 106 is moving in the arcuate path. After the food item is cooked, the curved heating member 106 rotates further in clockwise direction, thereby allowing the cooked food item on the convex surface 106*b* to be peeled off by the elongated blade 120. Simultaneously, when the curved heating member 106 arrives at the location near the feeder tank 124, the semi-solid liquid substance is again dispensed on the convex surface 106*b* and the process is repeated as explained in previous embodiments.

FIG. 7 illustrates a perspective view of an automatic cooking apparatus 100 in accordance with fourth embodiment of the present subject matter. The apparatus according to the present embodiment has a compact configuration in which the curved heating member 106 comprises a complete drum configuration and encompasses a heating member. The curved heating member 106 is mounted on the base structure 104 that comprises a horizontal base 108 and a vertical member 110, as shown in FIG. 7. The blade 120 and the feeder tank 124 are mounted in the proximity of the convex surface of the curved heating member 106. The process of dispensing and cooking of semi-solid liquid substance as well as peeling of the cooked food item from the convex surface of the curved heating member 106 is similar to that explained in the embodiment of FIG. 6. The apparatus 100 of the present embodiment also comprises a front cap C, which also acts as a control panel. In a preferred embodiment, the front cap C has a plurality of knobs 114 or digital interface unit mounted on it for operating the apparatus 100. The feeder tank 124 is mounted on the base structure 104 at both ends. One or more provisions, such as in the form of arcuate slots are provided at the feeder tank mounting section on the base structure 104 and the front cap C for enabling rotation of the feeder tank 124 during dispensing of semi-solid liquid substance.

Figures 9, 10, 11, 12:
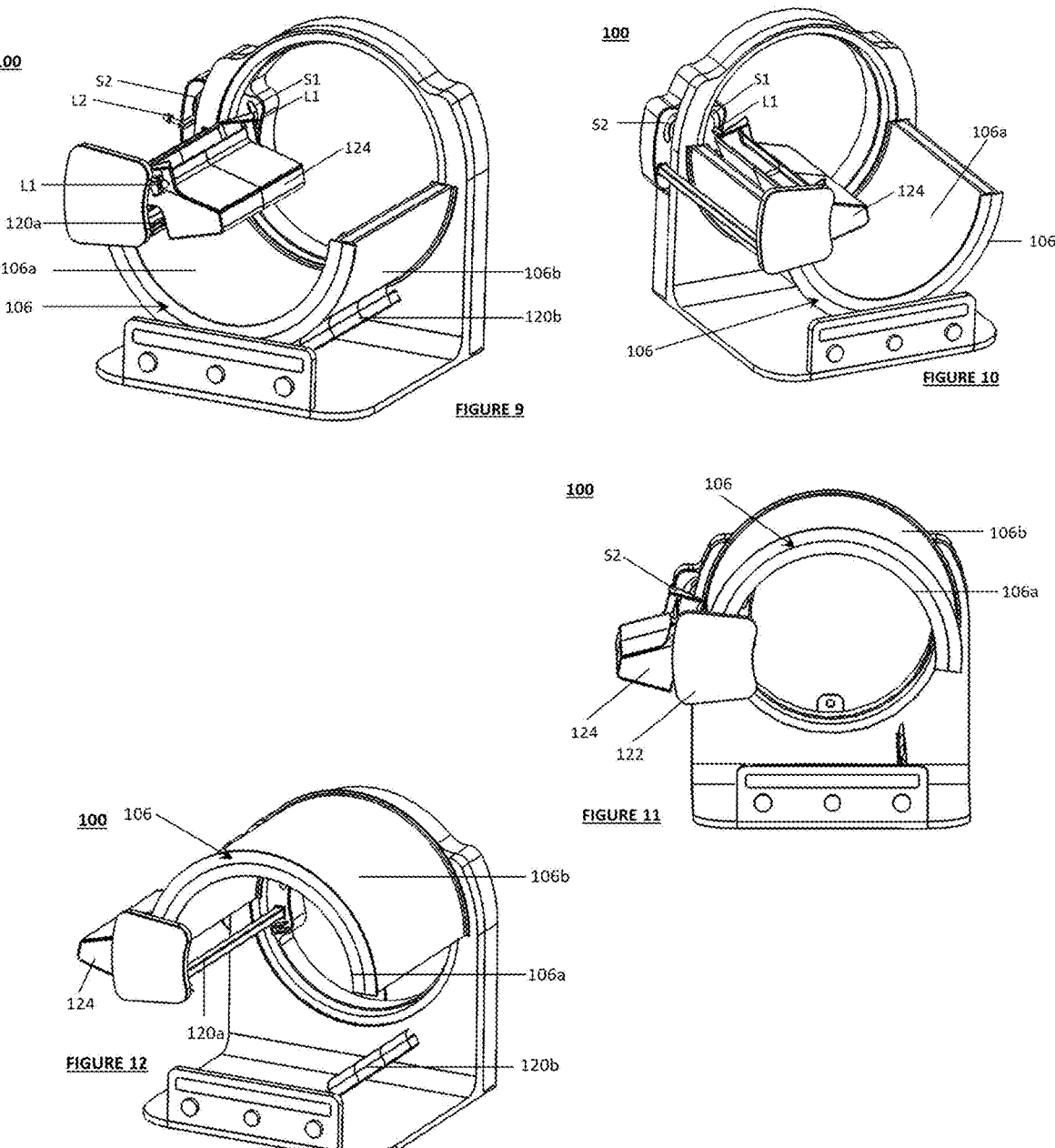

FIGS. 8, 9 & 10 illustrate a front view, a front perspective view from right side and a front perspective view from left side respectively of an automatic cooking apparatus 100 depicting the curved heating member 106 oriented in bottommost position/cooking position of concave surface printing in accordance with fifth embodiment of the present subject matter. FIGS. 11, 12 & 13 illustrate a front view, a front perspective view from right side and a front perspective view from left side respectively of an automatic cooking apparatus 100 depicting the curved heating member 106 oriented in topmost position/cooking position of convex surface printing in accordance with fifth embodiment of the present subject matter. In the present embodiment, the apparatus 100 is configured to cook a food item either on concave surface 106*a* or on the convex surface 106*b* of the curved heating member 106. In this regard, the heating member is mounted between the concave surface 106*a* and the convex surface 106*b* of the curved heating member 106 and both the concave surface 106*a* and the convex surface 106*b* form heating or cooking surfaces. In an embodiment, two concentric curved heating members 106 may be provided and the heating member may be mounted inside the space between said two concentric curved heating members 106.

Further, a first blade 120*a* is provided towards the concave surface 106*a* of the curved heating member 106 and a second blade 120*b* is provided towards the convex surface 106*b* of the curved heating member 106, as shown in FIGS. 9 and 12. The elongated structure 122 of the present embodiment comprises a plurality of provisions for mounting the feeder tank 124 either towards the concave surface 106*a* or the convex surface 106*b* of the curved heating member 106. In a preferred embodiment, the provisions for mounting the feeder tank 124 on the elongated structure 122 comprises one or more arcuate slots S1, S2 as shown in FIGS. 8, 9, and 11. At least one feeder lever L is mounted in each arcuate slot S1, S2. The feeder tank 124 is mounted on feeder levers L provided at the opposite ends and the feeder levers L1, L2 move in respective arcuate slots S1, S2 for rotating the feeder tank 124, whenever required.

When the feeder tank 124 is mounted on feeder levers L1, which are configured to move in the first set of arcuate slots S1 respectively, the concave surface 106*a* of the curved heating member 106 is used as the cooking surface and the first blade 120*a* is used to peel the cooked food item from the concave surface 106*a*, as shown in FIGS. 8, 9 and 10. In this configuration, cooking operation is performed in a similar manner as explained in the embodiment of FIG. 5. Similarly, when the feeder tank 124 is mounted on feeder levers L2, which are configured to move in the second set of arcuate slots S2 respectively, the convex surface 106*b* of the curved heating member 106 is used as the cooking surface and the second blade 120*b* is used to peel the cooked food item from the convex surface 106*b*, as shown in FIGS. 11, 12 and 13. In this configuration, cooking operation is performed in a similar manner as explained in the embodiment of FIG. 6.

FIG. 14 illustrates a rear perspective view of an automatic cooking apparatus 100 depicting the driving mechanism in accordance with fifth embodiment of the present subject matter. As shown herein, various components of the driving mechanism are supported by and located in the vertical member 110 of the base structure 104 and are covered by the rear wall 137. However, for the purpose of illustration of components and sub-assemblies of the driving mechanism, the rear wall 137 of the vertical member 110 is not shown in FIG. 14. In the present embodiment, the wheel 128 is fixed to the rear side of the curved heating member 106. In an embodiment, the wheel 128 forms an integral part of the curved heating member 106 whereas in other embodiments, the wheel 128 may be detachably attached to the curved heating member 106. The wheel 128 forms the drive member of the curved heating member 106 such that rotation of the wheel 128 causes rotation of the curved heating member 106. In a preferred embodiment, the wheel 128 comprises a plurality of circumferential teeth 130, which engage with thread 132 on the main drive shaft 134. The main drive shaft 134 is actuated by a main drive motor 136 as shown in FIG. 14. In the embodiment depicted in FIG. 14, the sub-assembly comprising the wheel 128 and the main drive shaft 134 operates as a worm wheel drive assembly. In other words, the main drive shaft 134 once actuated by the main drive motor 136 rotates about its axis. The rotation of the main drive shaft 134 causes rotation of the wheel 128 about its axis, which is perpendicular to the axis of the main drive shaft 134, due to engagement of the thread 132 of main drive shaft 134 with the teeth 130 on the wheel 128. This causes rotation of the curved heating member 106. The degree of rotation or oscillation of the wheel 128 is regulated by regulating the main drive motor 136.

The dispensing of the semi-solid liquid substance on the cooking surface of the curved heating member 106 by done by a dispensing mechanism comprising but not limited to the feeder levers L1, L2, a feeder motor M, a first gear member G1 and a second gear member G2 as shown in FIG. 14. In an embodiment, the feeder motor M is directly attached to and rotates the second gear member G2 upon actuation. Since the first gear member G1 and the second gear member G2 are in mesh with each other by means of circumferential teel, rotation of the second gear member G2 enables rotation of the first gear member G1 as well. The rotation of gear members G1, G2, enable arcuate movement of feeder levers L1, L2 in respective arcuate slots S1, S2, thereby enabling rotation of the feeder tank 124 during the dispensing operation. In different embodiments, the feeder motor M may be attached directly to the first gear member G1 or both the gear members G1, G2 to enable rotation of the feeder tank 124.

In a preferred embodiment the curved heating member 106 is supported on the base structure 104 by means of a plurality of support members B1, B2, B3. The support members may comprise one or more bearings, bushes and the like. The support members B1, B2, B3 are configured to hold circumference of the rotating curved heating member 106 in the all the embodiments described above. In an embodiment, the curved heating member 106 can be supported by placing the support members B1, B2, B3 in the axis of rotation of the curved heating member 106 in the all the embodiments described above. In a preferred embodiment, the apparatus comprises a power board P for switching the apparatus ON.

FIG. 15 illustrates a perspective view of the automatic cooking apparatus 100 depicting the driving mechanism in accordance with the fourth embodiment explained in FIG. 7 above. The apparatus according to the present embodiment is driven by a single motor, i.e. the main drive motor 136 and comprises a gear mechanism for rotating the curved heating member 106 as well as feeder levers L. In an embodiment, the main drive motor 136 rotates a driving gear GD, which in turn rotates a main gear GM through an intermediate gear GI. The main gear GM is attached to and rotates the curved heating member 106 upon its rotation. During the rotation of curved heating member, a special cam profile in curved heating member results in rotation of the feeder gear member GF, thereby moving the feeder levers L in the arcuate slots S. FIG. 15 depicts an embodiment of the gear mechanism and any variation of the gear mechanism can be employed in the apparatus for enabling rotation of the curved heating member 106 and feeder levers L without departing from the scope of the present invention.

FIGS. 16 to 22 illustrate schematic representations of the automatic dispensing, cooking and serving apparatus depicting working of said apparatus for cooking a food item on the concave surface 106a of the curved heating member 106 in accordance with one embodiment of the present subject matter. FIG. 16 depicts the home position/cooking position of concave surface printing of the apparatus 100. As shown herein, the feeder tank 124 is pre-filled with a semi-solid liquid substance 138, such as batter for dosa, crepe, uttapam and other similar dishes. The pre-filling of the feeder tank 124 can be done automatically by a batter container or tank (not shown) or manually by the user. In a preferred embodiment, the feeder tank 124 is configured to accommodate batter for preparing up to 10 food items, such as dosa, uttapam etc. In the present embodiment, the curved heating member 106 comprises the concave surface 106a that forms the heating surface or cooking surface. The curved heating member 106 encompasses the heating element 139 therein. The feeder tank is mounted towards the concave surface 106a. The feeder tank 124 is hingedly attached to the base structure 104 about its end near the open end 126. The hinge enables rotation of the feeder tank 124, as shown by arrow A. The blade 120 is placed adjacent to the concave surface 106a of the curved heating member 106 and downstream to the feeder tank 124 in the direction of rotation (shown by B) of the curved heating member 106.

Figures 17, 18, 19, 20:
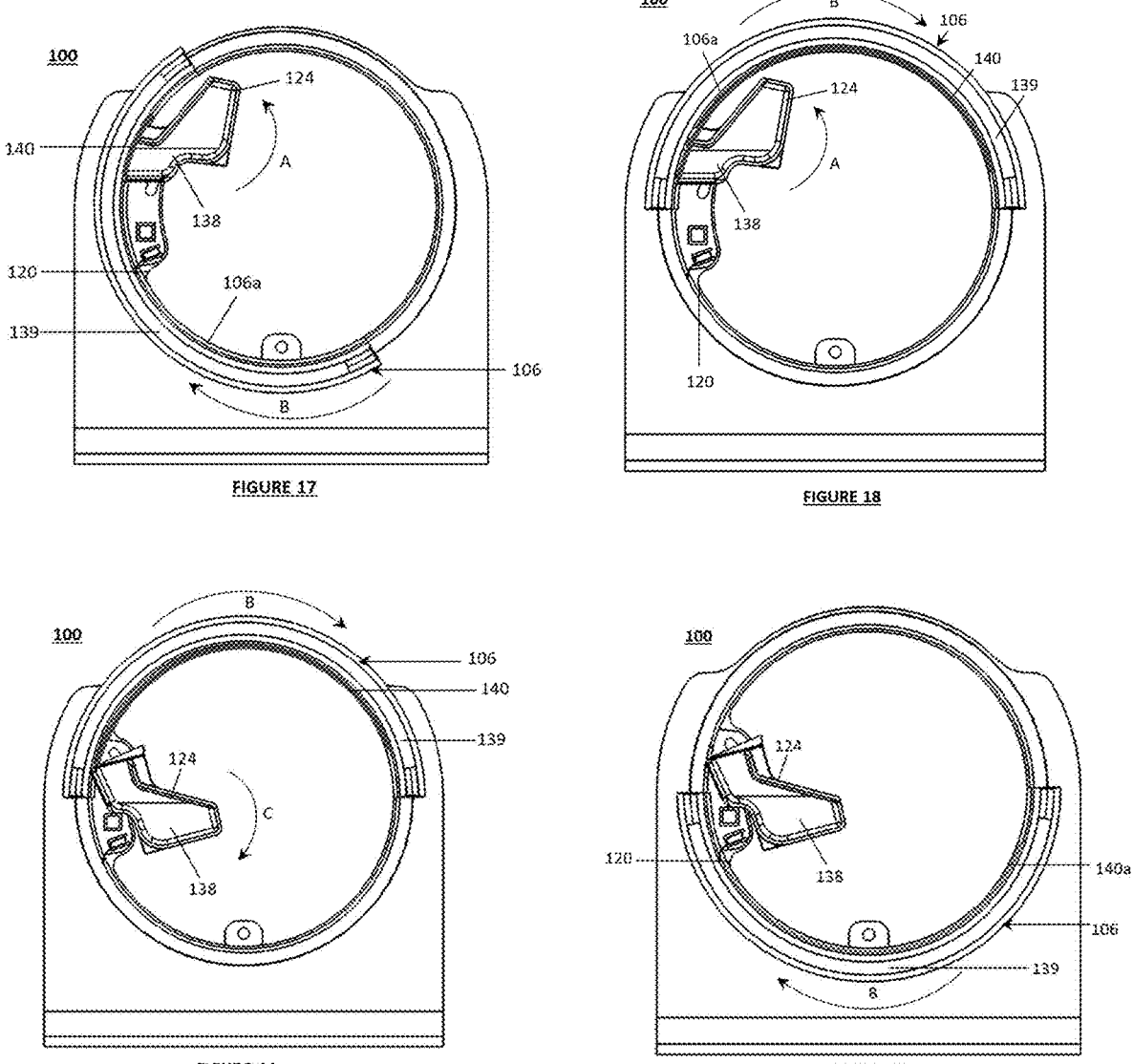

FIG. 17 illustrates the dispensing or printing position of the apparatus 100 when the curved heating member 106 starts to move in an arcuate path to print a semi-solid liquid substance 138 on its concave surface 106a. Upon actuation, the curved heating member 106 starts rotating in the direction shown by arrow B. Simultaneously, the feeder tank 124 is also tilted in the direction shown by arrow A. The tilting of the feeder tank 124 allows the semi-solid liquid substance 138 to get dispensed onto the concave heating surface 106a of the curved heating member 106 and rotation of the curved heating member 106 allows the semi-solid liquid substance 138 to be spread or printed onto the concave surface 106a. The printing of semi-solid liquid substance 138 on the concave heating surface 106a is shown by reference numeral 140 in FIG. 17.

Figures 21, 22, 23, 24:
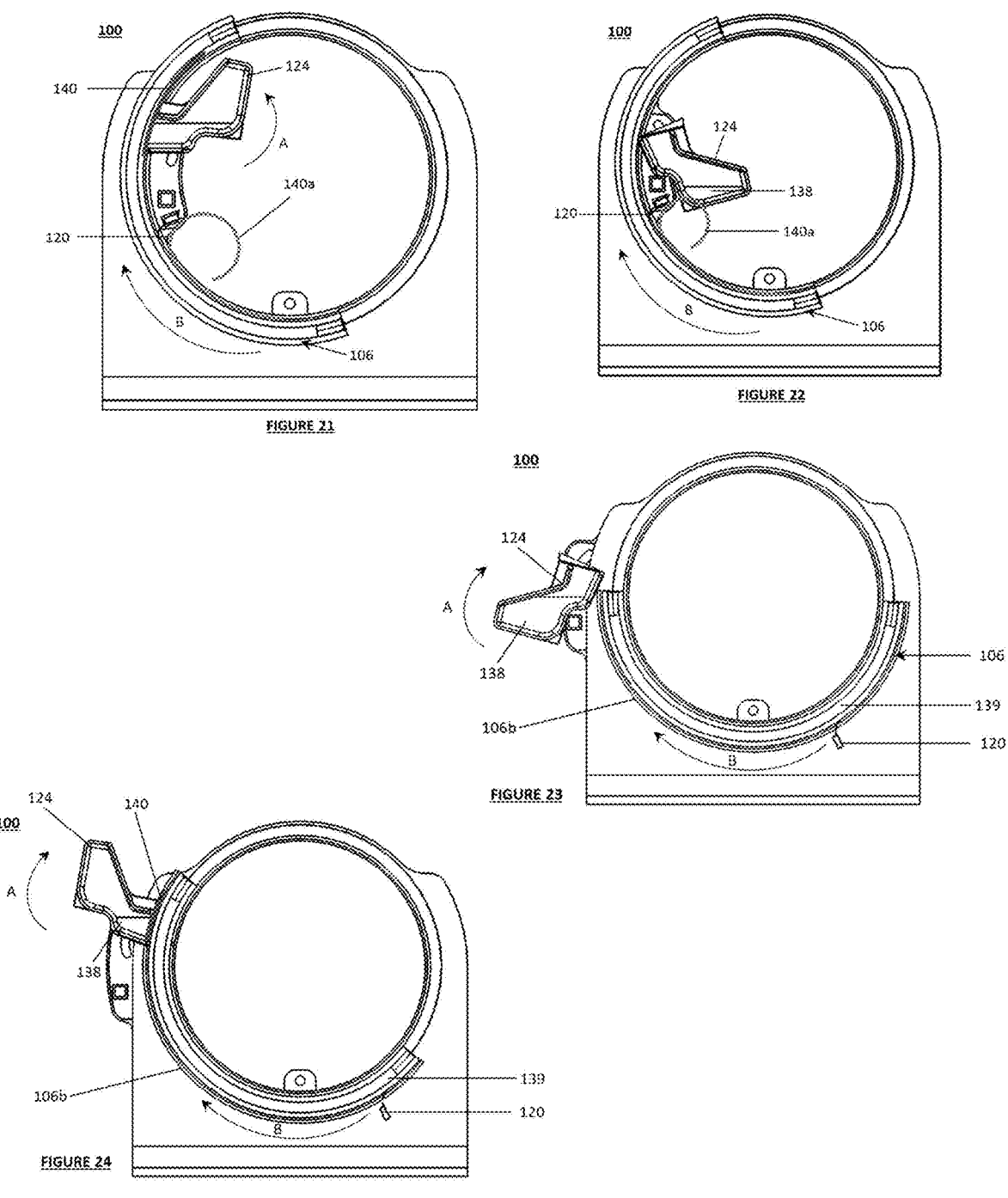

FIG. 18 illustrates the end of printing position of the apparatus 100, i.e. when a required amount of semi-solid liquid substance 138 is printed on the curved surface 106a of the curved heating member 106. At this point, the curved heating member 106 attains the topmost position in the arcuate path defined by the curved heating member 106. Once the dispensing or printing of the semi-solid liquid substance 138 on the curved heating member 106 is complete, the feeder tank 124 is retracted back to its retracted position as shown by arrow C in FIG. 19. However, the curved heating member 106 rotates further in the direction of B and comes back to its original position, which is the bottommost position in the arcuate path of the curved heating member 106, after completing one revolution in the arcuate path, as shown in FIG. 20. The bottommost position of the curved heating member 106 is also the cooking position of the apparatus 100 of present configuration. The curved heating member 106 stays in this position for a stipulated time to allow cooking of the semi-solid liquid substance 140 printed on it. Simultaneously, if required, a topping or filling can be added at the top of the printed semi-solid liquid substance 140 while the curved heating member 106 is at the bottommost position. The cooked food item 140a is depicted in FIG. 20. Once the semi-solid liquid substance 140a is cooked and if required topping or filling is added, the curved heating member 106 is again made to rotate in the direction of arrow B as shown in FIG. 21. FIG. 21 illustrates the printing or dispensing position of the feeder tank 124 when the curved heating member 106 starts a second revolution in the arcuate path. The rotation of the curved heating member 106 in the second revolution enables the elongated blade 120 to start peeling the cooked food item 140a from the curved heating member 106 and at the same time the feeder tank 124 is tilted or swiveled in its dispensing position to dispense or print new semi-solid liquid substance 138 on the concave surface 106a of the curved heating member 106 as shown in FIG. 21. The semi-solid liquid substance printed on the curved cooking plate is depicted by reference numeral 140 and the cooked food item being peeled is depicted by reference numeral 140a in FIG. 21. In the second revolution, the semi-solid liquid substance 140 now dispensed on the curved heating member 106 moves to the top-most position as shown in FIG. 18. At the same time the cooked food item 140 is completely peeled by the elongated blade 120 and served to the user automatically through to the gap created due to partial drum configuration of the curved heating member 106. Once the last food item 140a is cooked, it is only peeled by the elongated blade 120 as shown in FIG. 22 and in this stroke, the feeder tank 124 does not print semi-solid liquid substance 138 on the concave surface 106a.

FIGS. 23 to 29 illustrate schematic representations of the automatic cooking apparatus depicting working of said apparatus for cooking a food item on the convex surface 106b of the curved heating member 106 in accordance with one embodiment of the present subject matter. FIG. 23 depicts the home position of convex surface printing of the apparatus 100. As shown herein, the curved heating member 106 comprises the convex surface 106b that forms the heating surface or cooking surface. The curved heating member 106 encompasses the heating element 139 therein. The feeder tank 124 is mounted towards the convex surface 106b and is hingedly attached to the base structure 104 about its end near the open end 126. The blade 120 is placed adjacent to the convex surface 106b of the curved heating member 106 and away from the feeder tank 124 in the direction of rotation (shown by B) of the curved heating member 106.

FIG. 24 illustrates the dispensing or printing position of the apparatus 100 when the curved heating member 106 starts to move in an arcuate path to print a semi-solid liquid substance 138 on its convex surface 106b. Upon actuation, the curved heating member 106 starts rotating in the direction shown by arrow B. Simultaneously, the feeder tank 124 is also tilted in the direction shown by arrow A. The tilting of the feeder tank 124 allows the semi-solid liquid substance 138 to get dispensed onto the convex heating surface 106b of the curved heating member 106 and rotation of the curved heating member 106 allows the semi-solid liquid substance 138 to be spread or printed onto the convex surface 106b. The printing of semi-solid liquid substance 138 on the convex surface 106b is shown by reference numeral 140 in FIG. 24.

Figure 29:
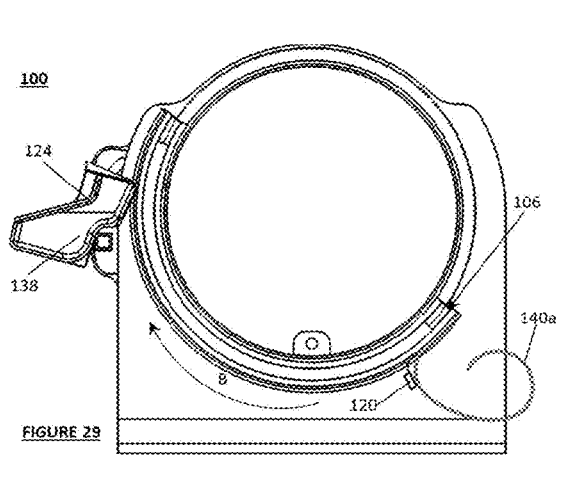

FIG. 25 illustrates the end of printing position of the apparatus 100, i.e. when a required amount of semi-solid liquid substance 138 is printed on the convex surface 106b of the curved heating member 106. At this point, the curved heating member 106 attains the topmost position in the arcuate path defined by the curved heating member 106. Once the dispensing or printing of the semi-solid liquid substance 138 on the curved heating member 106 is complete, the feeder tank 124 is retracted back to its retracted position as shown by arrow C in FIG. 26. However, the curved heating member 106 stays in the topmost position, which is also the cooking position of the apparatus 100 for a stipulated time to allow cooking of the semi-solid liquid substance 140 printed on it. The cooked food item 140a is depicted in FIG. 27. Thereafter, the curved heating member 106 rotates further in the direction of B in the arcuate path and is peeled by the blade 120, as depicted in FIG. 28. When almost entire cooked food item 140a is peeled and the front portion of the curved heating member 106 approaches the feeder tank 124, the feeder tank 124 is tilted again in the direction A to dispense the semi-solid liquid substance on the convex surface 106b in the second revolution in the arcuate path. The semi-solid liquid substance printed on the convex surface 106b is indicated by reference numeral 140 and the cooked food item being peeled is indicated by reference numeral 140a in FIG. 28. Once the last food item 140a is cooked, it is only peeled by the elongated blade 120 as shown in FIG. 29 and in this stroke, the feeder tank 124 does not print semi-solid liquid substance 138 on the convex surface 106b.

Once the feeder tank 124 is empty, it can be filled either manually or automatically by a batter container or tank. Alternately, the feeder tank 124 can be filled as soon as it comes back in its retracted position in every cooking cycle. For automatic dispensing of batter from the batter container or tank to the feeder tank 124, the batter container or tank may be activated by a separate motor or the main drive motor 136. In an embodiment, the batter container or tank comprises a one-way valve, which opens upon actuation by the separate motor or the main drive motor 136, thereby allowing batter to flow from the batter container or tank (not shown) into the feeder tank 124 under gravity. In another embodiment, an alternate mechanism (not shown) may be employed in the batter container or tank (not shown) to transfer the batter from the batter container or tank into the feeder tank 124.

FIGS. 30 to 34 illustrate a schematic representation of an automatic cooking apparatus 100 in accordance with sixth embodiment of the present subject matter. In the present embodiment, the apparatus 100 is configured to cook food items from semi-solid liquid substance, such as an egg mixture for cooking omelette. The apparatus according to the present embodiment also includes a dispensing mechanism comprising at least one storage tank 142 for storing the semi-solid liquid substance. The storage tank 142 is mounted in an inverted manner above the curved heating member 106. In an embodiment, the storage tank 142 is squeezable and can be squeezed by the user to dispense the semi-solid liquid substance on the curved heating member 106. In another embodiment, the storage tank 142 is automatically squeezed or triggered to dispense the semi-solid liquid substance on the curved heating member 106. In other embodiments, the storage tank 142 can be operated by operating a valve opening or a feed pump dispensing of the semi-solid liquid substance.

Figure 30:
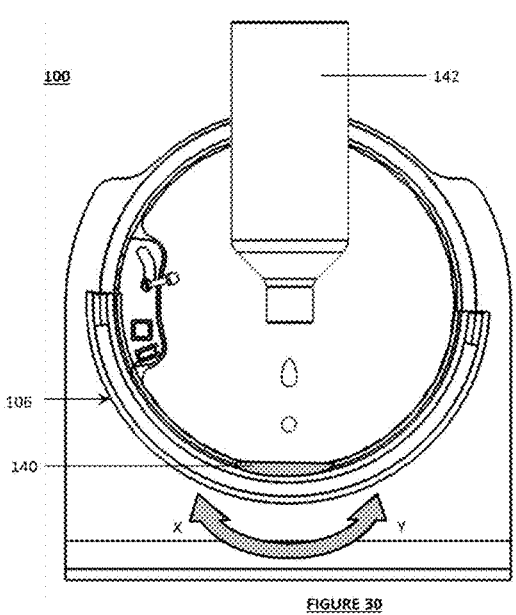
Figure 31:
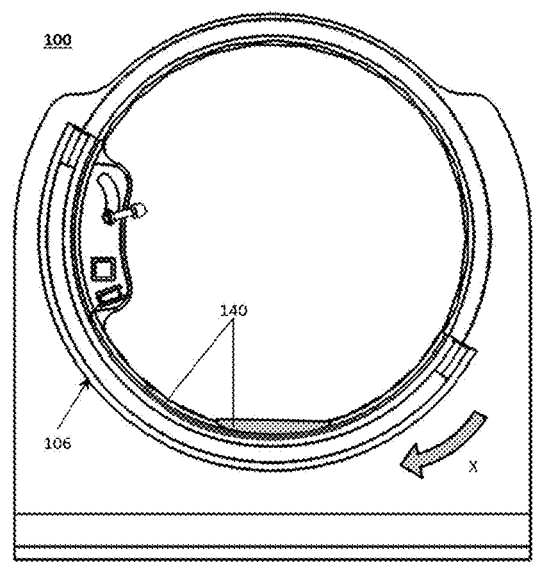
Figure 32:
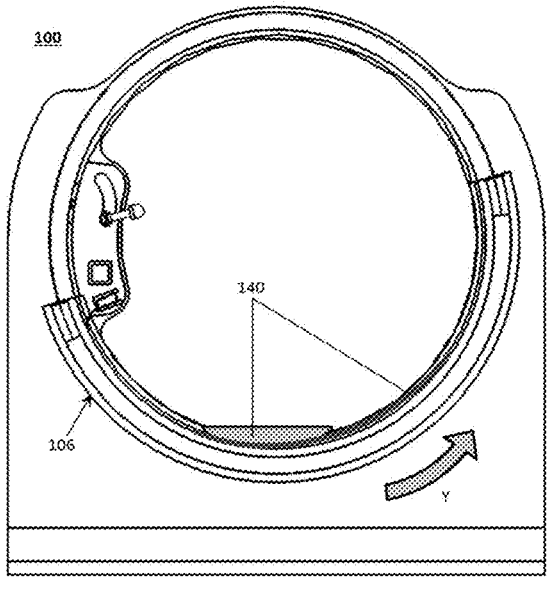

In an embodiment, the semi-solid liquid substance such as egg mixture or similar the like is dispensed directly onto the curved heating member 106 to prepare an omelette. Once the egg mixture is dispensed, the curved heating member 106 is swiveled in opposite directions by a pre-determined angle, as shown by arrows X and Y in FIGS. 30 to 32, for spreading the egg mixture on the curved heating member 106. FIGS. 30 to 32 depict different positions of the curved heating member during spreading function. Once the egg mixture is evenly spread as desired, the curved heating member 106 takes the original position as shown in FIG. 33 for completing the cooking process. The cooked food item 140a, i.e. omelette in the present embodiment, is depicted in FIG. 33. After being suitably cooked, the curved heating member 106 is rotated in the direction B for enabling automatic peeling of the omelette by the elongated blade 120, as shown in FIG. 34, in a preferred embodiment. In another embodiment, the cooked food item 140a can be manually peeled by the user. In an embodiment, the dispensing mechanism may include a combination of the storage tank 142 and the tank mechanism described in previous embodiments.

FIG. 35 illustrates a rear perspective view of the automatic cooking apparatus 100 in accordance with sixth embodiment of the present subject matter. The major components of the apparatus 100 according to the present embodiment are the same as those described in previous embodiments. The additional components of the apparatus 100 in the present embodiment include but no limited to one or more tanks 142 and one or more flow tubes 144 for storing and dispensing one or more semi-solid liquid substance for cooking food items of same or different categories. The tanks 142 are mounted on the base structure 104 by means of one or more brackets or tank holders 146. Similarly, the flow tubes 144 are mounted on the base structure 104 by means of one or more brackets or flow tube holders 148. In a preferred embodiment, the tank holders 146 and the flow tube holders 148 are attached to the rear wall 150 of the vertical member 110 of the base structure 104.

The tanks 142 of the present embodiment comprise containers having any configuration or shape, such as tubular, square and other similar shapes, which are capable of storing one or more semi-solid liquid substances whereas flow tubes 144 provide passage to respective semi-solid liquid substance from the tanks 142 to the curved heating member 106. One or more feed pumps 152 are provided for feeding the required dosage of the semi-solid liquid substance from tanks 142 to respective flow tubes 144 and hence, onto the curved heating member 106. In an embodiment, a power board P is provided in the base structure 104 to provide power connection to the apparatus 100.

In an embodiment, the apparatus 100 comprises one or more chopping or stirring rollers 154 as an accessory as shown in FIG. 36. In an embodiment the rollers 154 are configured to agitate, scramble and/or chop the semi-solid liquid substance. The chopping or stirring roller 154 comprises a plurality of chopping or stirring members 156 distributed throughout its circumference for performing the chopping or stirring operation on the semi-solid liquid substance, such as an egg mixture. During swiveling of the curved heating member 106, for example for spreading the semi-solid liquid substance like egg mixture on the curved heating member 106 as depicted in FIGS. 30 to 34, the chopping or stirring roller 154 is rotated, thereby leading to chopping or stirring the semi-solid liquid substance. This is particularly useful in cooking scrambled eggs in an embodiment. In another embodiment, more than one chopping or stirring roller 158 may be provided in the apparatus 100 depending upon the requirement. In yet another embodiment, one or more chopping or stirring rollers 154 may be manually placed over the curved heating member 106 during use or may be a fixed attachment to the apparatus 100. Alternately, instead of chopping or stirring rollers, one or more profile rollers (not shown) may be provided for achieving desired profiles or shapes on cooked food item such as dosa, crepe, omelette and other similar food items.

Various mechanisms may be employed to rotate the chopping or stirring rollers in relation to the curved heating member 106. In an embodiment, an arcuate toothed track may be provided on the curved heating member 106 or the base structure 104. In said embodiment, the arcuate toothed track forms a track for the chopping or stirring roller 154. The arcuate toothed track, in an embodiment, has a semi-circular shape with curvature same as that of the curved heating member 106. However, the shape and curvature of the arcuate toothed track may be different as would be clear to a person skilled in the art.

Figure 39:
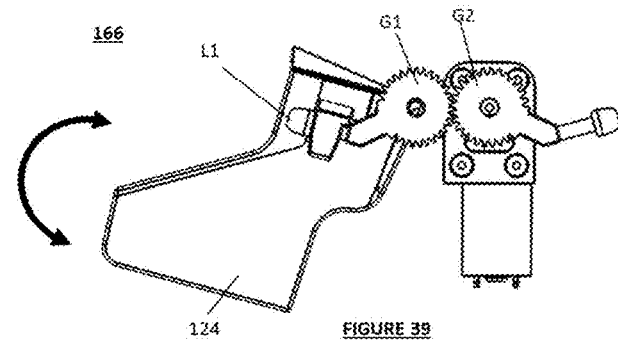
Figure 40:
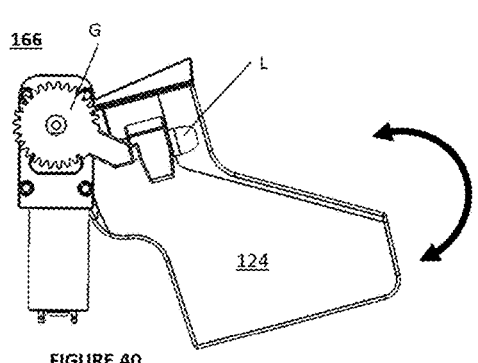
Figure 41:
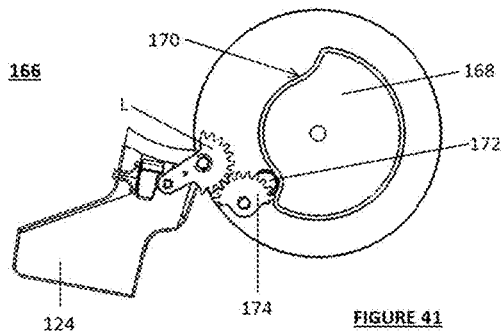

FIGS. 37 and 38 illustrate a perspective view and an opened view of the feeder tank 124 in an embodiment of the present subject matter. As shown herein, the feeder tank 124 comprises a feeder tank base 158 and a lid 160 in an embodiment. The lid 160 of the present embodiment can be made detachable. The feeder tank 124 with the lid 160 detached therefrom is depicted in FIG. 38. In an embodiment, the feeder tank 124 may comprise one or more separators 162 as shown in FIGS. 37 and 38. The separators 162 are configured to separate the tank inner volume, thereby enabling the users to store different types of semi-solid in a single feeder tank 124 for preparing different variety of food items in a single cooking operation of the apparatus. The feeder tank 124 further comprises a feeder tank lock 164 for mounting the feeder tank 124 on the feeder levers L, L1, L2 described above, FIGS. 39 to 44 illustrate schematic representations of feeder tank rotation mechanisms 166 in different embodiments. The feeder tank rotation mechanism 166 may be motor driven, as depicted in FIGS. 39 and 40, or cam driven, as depicted in FIGS. 41 to 44. The motor driven feeder tank rotation mechanism 166 in the embodiment in which the feeder tank 124 is mounted on the concave surface 106a of the curved heating member 106 comprises a pair of gears G1, G2 as shown in FIG. 39. In this embodiment, the feeder tank 124 is mounted on the feeder lever L1 that is further attached to the first gear G1. The first gear G1 is in continuous engagement with the second gear G2, which is driven by the feeder motor M. Therefore, actuation of the second gear G2 by the feeder motor M rotates the second gear G2, which in turn rotates the first gear G1, thereby leading to movement of the feeder lever L1 in the arcuate slot S1 (shown in previous embodiments). This allows the feeder tank 124 to rotate or swivel for dispensing the semi-solid liquid substance on the concave surface 106a of the apparatus 100. Rotation of the gears G1, G2 in the opposite direction leads to retraction of the feeder tank 124 in its original position, marking completion of the dispensing operation. The feeder tank rotation mechanism 166 of the present embodiment is also applicable to the apparatus in which both sides of the curved heating member 106 can be configured as cooking surfaces.

FIG. 40 depicts the embodiment in which the feeder tank 124 is mounted on the convex surface 106b of the curved heating member 106. In this embodiment, a single gear G is attached to and actuated by the feeder motor M. The gear G enables rotation of the feeder tank 124 in the dispensing position and the dispensing position through the feeder lever L.

Figures 42, 43, 44, 45:
Figures 46, 47:
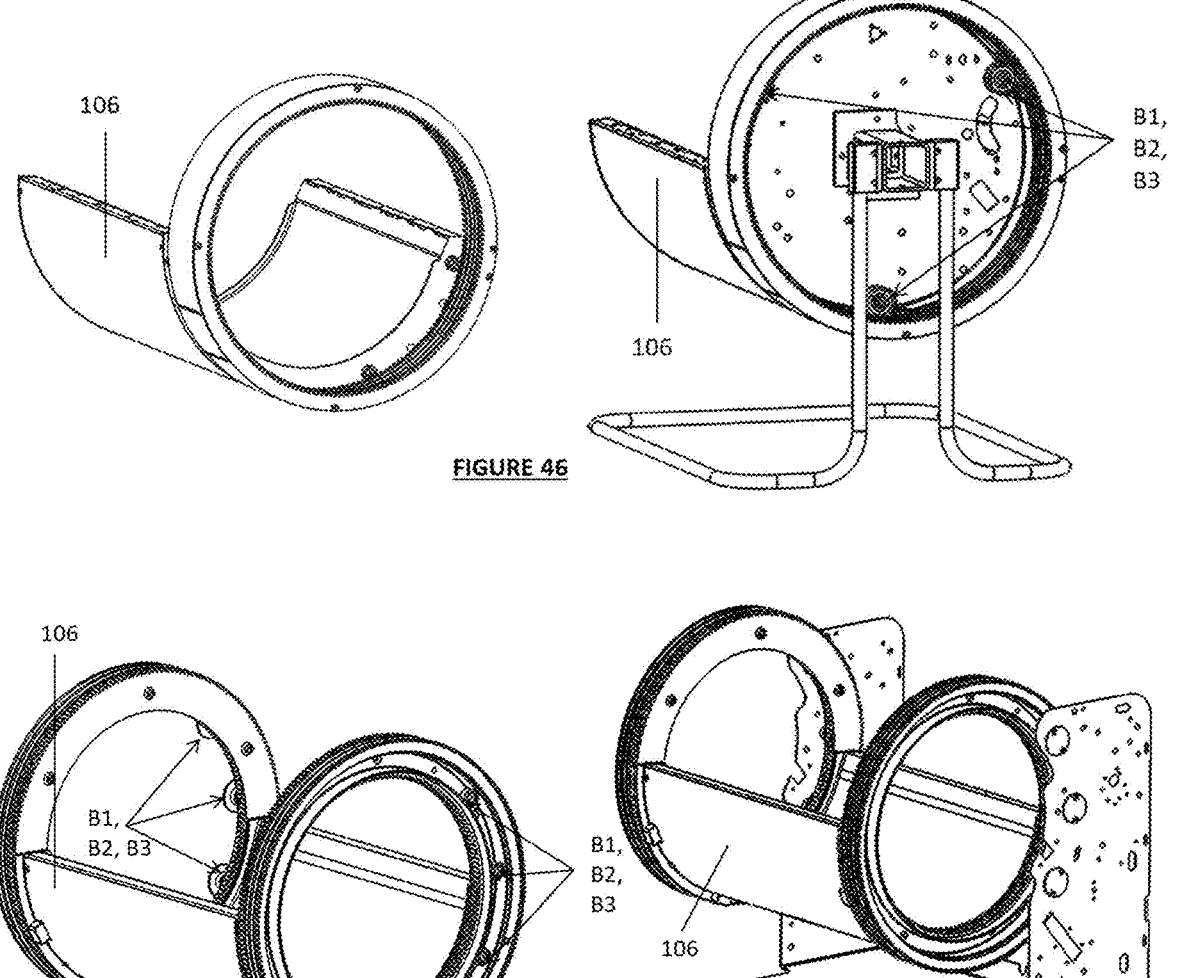

The cam driven feeder tank rotation mechanism 166 is depicted in FIGS. 41 to 44. In the present embodiment, a cam profile 168 with a track 170 is attached to the curved heating member 106. A bearing 172 attached in an intermediate gear 174 follows the track 170 in the cam profile 168 during the rotation of curved heating member 106. This enables the partial rotation movement in intermediate gear 174. The required rotation of feeder tank 124 is achieved through the gear arrangement between feeder lever L and intermediate gear 174. In other words, bearing 172 moves along with the track 170 of the cam profile 168. The rotation of the cam operates the feeder lever L through an intermediate gear 174, thereby enabling rotational movement of the feeder tank 124. In the present embodiment, clockwise rotation of the cam profile 168 results in rotation of the feeder tank 124 in the dispensing position. Different positions of the feeder tank 124 while moving from its original position to the dispensing position are shown in FIGS. 42 and 43, which figures also depict positions of the cam profile 168, the intermediate lever 174 and the feeder lever L respectively. In a preferred embodiment, FIG. 43 depicts the dispensing position of the feeder tank 124. The feeder tank 124 remains in this position during further rotation of the cam profile 168 in clockwise direction till the cam attains the position depicted in 44. In this position, further rotation of the cam profile 168 in clockwise direction results in retraction of the feeder tank 124 from the dispensing position to the original position by self-weight of feeder tank 124. While retracting to its original position, the feeder tank 124 recollects the excess semi-solid liquid substance from the coking surface.

FIGS. 45 to 49 depict various mechanisms for supporting the curved heating member 106. In the embodiment depicted in FIG. 45, the support members B1, B2, B3 comprising bearings are placed at single sides in the outer circumference of the rotating curved heating member 106, thereby providing support at outer circumference of the curved heating member 106. In the embodiments depicted in FIGS. 46, the support members B1, B2, B3 comprising bearings are placed at one side in the inner circumference of the rotating curved heating member 106, thereby providing support at inner circumference of the curved heating member 106. In the embodiments depicted in FIGS. 47, the support members B1, B2, B3 comprising bearings are placed at both sides in the inner circumference of the rotating curved heating member 106, thereby providing support at inner circumference of the curved heating member 106. In the embodiment depicted in FIG. 48, the support members B1, B2, B3 comprising bearings are placed on both sides in the axis of the rotating curved heating member 106, thereby providing support at the axis of rotation of the curved heating member 106. In the embodiment depicted in FIG. 49, the support members B1, B2, B3 comprising bearings are placed on single side in the axis of the rotating curved heating member 106, thereby providing support at the axis of rotation of the curved heating member 106.

Figures 51, 52, 53, 54:
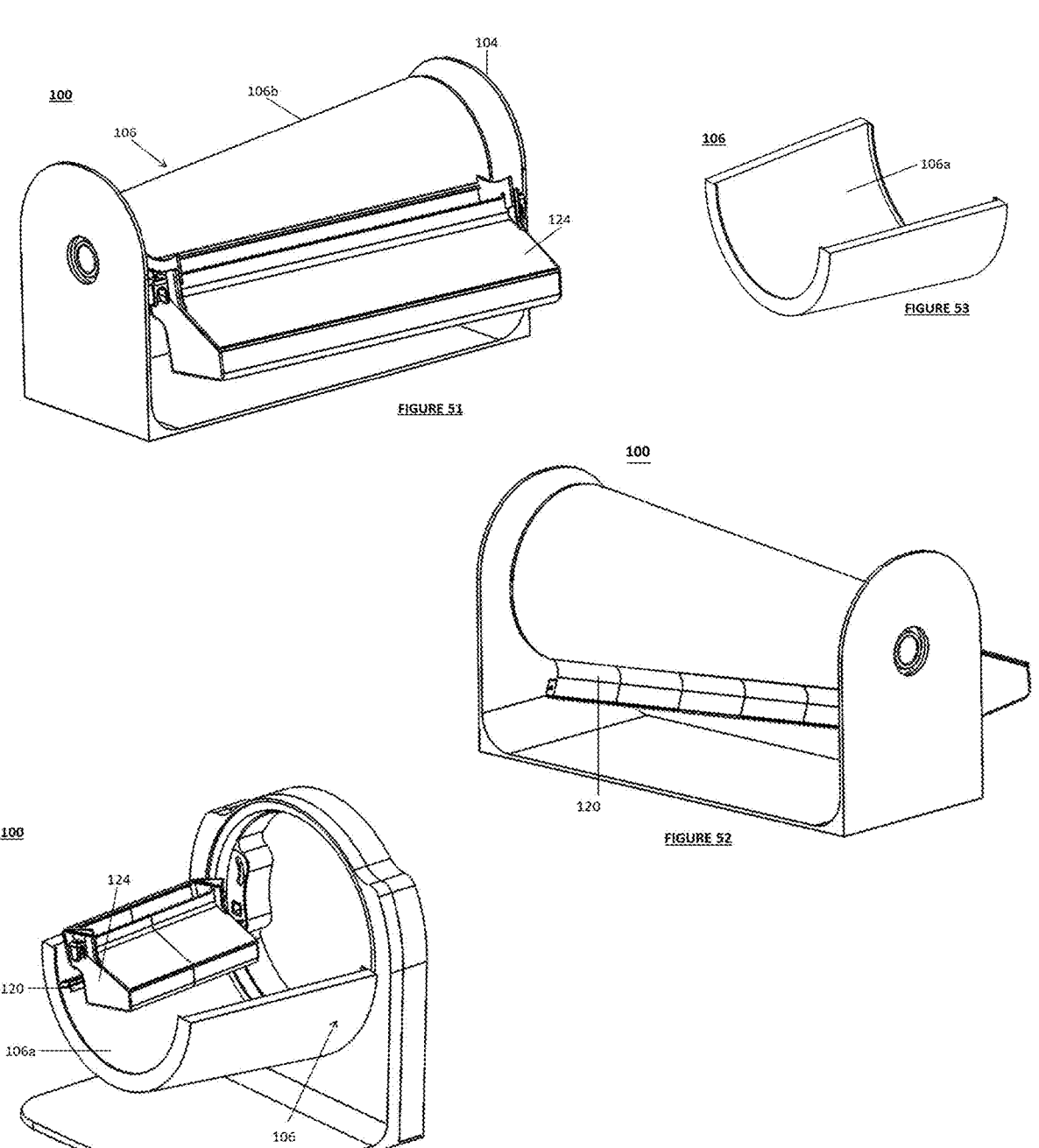

FIGS. 50 to 54 depict various configurations of the curved heating member 106 in different embodiments. As shown in FIG. 50, the curved heating member 106 may comprise a conical-shaped drum. This configuration of the curved heating member 106 is particularly suitable for the embodiment in which cooking surface is the convex surface 106b of the curved heating member 106. FIGS. 51 and 52 illustrate a front perspective view and a rear perspective view of the apparatus 100 with conical-shaped drum of FIG. 50. In this embodiment, the outer convex surface 106b forms the cooking surface. The working of the apparatus is the same as explained in previous embodiments.

FIG. 53 shows that the curved heating member 106 may comprise a partial conical-shaped drum. This configuration of the curved heating member 106 is particularly suitable for the embodiment in which cooking surface is the concave surface 106a of the curved heating member 106. FIG. 54 illustrates a perspective view of the apparatus 100 with partial conical-shaped drum of FIG. 53. In this embodiment, the concave surface 106a of the partial conical-shaped drum forms the cooking surface. The working of the apparatus is the same as explained in previous embodiments.

The apparatus according to the present invention is also capable of cooking products of different sizes by altering the feeder dispense and retract position with respect to the curved heating/cooking surface. Moreover, thickness of the cooked food item can be varied by changing the rotational speed of the curved hearing/cooking surface. Furthermore, different types of holding mechanisms may be provided of supporting the curved heating member 106.

While the preferred embodiments of the present invention have been described hereinabove, it should be understood that various changes, adaptations, and modifications may be made therein without departing from the spirit of the invention and the scope of the appended claims. It will be obvious to a person skilled in the art that the present invention may be embodied in other specific forms without departing from its spirit or essential characteristics. The described embodiments are to be considered in all respects only as illustrative and not restrictive.

We claim:

1. An automatic cooking apparatus comprising:
at least one curved heating member configured to move in an arcuate path,
the at least one curved heating member comprising at least one heating surface; and
at least one dispensing mechanism comprising at least one rotatable feeder tank rotatably disposed in the proximity of the heating surface, the at least one rotatable feeder tank rotates in relation to the curved heating member for dispensing at least one semi-solid liquid substance on the at least one heating surface;
the at least one curved heating member, in the course of dispensing of the at least one semi-solid liquid substance on the at least one heating surface by rotating the at least one rotatable feeder tank towards the at least one heating surface, moves in the arcuate path to spread the at least one semi-solid liquid substance on the at least one heating surface, and attains one or more cooking positions in the arcuate path after the at least one semi-solid liquid substance is suitably spread on the at least one heating surface for cooking the at least one semi-solid liquid substance.

2. The automatic cooking apparatus of claim 1, wherein the at least one curved heating member comprises a drum- or semi-drum- or partial-drum-configuration having same or varying diameter across its length and is configured to rotate, in clockwise and/or anticlockwise direction, by about 360 degrees or less than 360 degrees in the arcuate path.

3. The automatic cooking apparatus of claim 2, wherein the at least one heating surface comprises a concave surface of the at least one curved heating member or a convex surface of the at least one curved heating member or both concave and convex surfaces of the at least one curved heating member.

4. The automatic cooking apparatus of claim 1, wherein the at least one dispensing mechanism comprises at least one storage tank and/or at least one feeder tank mechanism having at least one rotatable feeder tank for dispensing the at least one semi-solid liquid substance on the at least one heating surface.

5. The automatic cooking apparatus of claim 4, wherein the feeder tank mechanism comprises a feeder motor and a gear mechanism or cam mechanism for rotating the feeder tank in a dispensing position and a retracted position.

6. The automatic cooking apparatus of claim 5, wherein the feeder tank comprises one or more separators for separating the inner volume of the feeder tank, thereby enabling cooking of different varieties of food items in a single cooking operation.

7. The automatic cooking apparatus of claim 1, wherein the at least one dispensing mechanism is mounted on a base structure and/or an elongated structure supported on the base structure to dispense the semi solid liquid substance on the cooking surface of the heating member.

8. The automatic cooking apparatus of claim 1 comprising a peeling mechanism for removing a cooked food item, prepared by cooking the at least one semi solid liquid substance on the at least one heating surface, from the at least one heating surface.

9. The automatic cooking apparatus of claim 1 comprising a driving mechanism comprising a worm wheel drive assembly or spur gear drive assembly for moving the at least one curved heating member 106 in an arcuate path.

\* \* \* \* \*